(12) United States Patent
Randell et al.

(10) Patent No.: US 6,415,439 B1
(45) Date of Patent: Jul. 2, 2002

(54) PROTOCOL FOR A WIRELESS CONTROL SYSTEM

(75) Inventors: Scott Randell; Leonardo Del Castillo, both of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/795,710

(22) Filed: Feb. 4, 1997

(51) Int. Cl.[7] .............................. H04N 7/18; H04N 9/47; H04N 7/20

(52) U.S. Cl. .......................... 725/153; 725/63; 725/73; 725/74; 348/61

(58) Field of Search .............................. 725/63, 73–74, 725/153; 348/61; 434/322, 307; 370/230, 329, 395.2; 340/825.52, 825.69, 825.72, 2.4; 455/509, 514, 450, 117

(56) References Cited

U.S. PATENT DOCUMENTS

| | | | |
|---|---|---|---|
| 3,493,674 A | 2/1970 | Houghton | |
| 3,743,767 A | 7/1973 | Bitzer et al. | |
| 3,891,792 A | 6/1975 | Kimura | |
| 3,900,887 A | 8/1975 | Soga et al. | |
| 3,993,861 A | 11/1976 | Baer | |
| 4,186,413 A | 1/1980 | Mortimer | |
| 4,207,704 A | 6/1980 | Akiyama | |
| 4,540,176 A | 9/1985 | Baer | |
| 4,599,644 A | 7/1986 | Fischer | |
| 4,660,033 A | 4/1987 | Brandt | |
| 4,665,431 A | 5/1987 | Cooper | |
| 4,807,031 A | 2/1989 | Broughton et al. | |
| 4,840,602 A | 6/1989 | Rose | |
| 4,846,693 A | 7/1989 | Baer | |
| 4,847,699 A | 7/1989 | Freeman | |
| 4,847,700 A | 7/1989 | Freeman | |
| 4,864,607 A | 9/1989 | Mitamura et al. | |
| 4,930,019 A | * 5/1990 | Chu | 386/96 |
| 4,949,327 A | 8/1990 | Forssee et al. | |
| 5,021,878 A | * 6/1991 | Lang | 348/61 |
| 5,108,341 A | 4/1992 | DeSmet | |
| 5,198,893 A | 3/1993 | Lang | |
| 5,270,480 A | 12/1993 | Hikawa | |
| 5,655,945 A | 8/1997 | Jani | |
| 5,855,483 A | * 1/1999 | Collins et al. | 434/322 |
| 6,075,195 A | * 6/2000 | Gabai et al. | 84/645 |

FOREIGN PATENT DOCUMENTS

WO    WO/91/10490    7/1991

* cited by examiner

Primary Examiner—Andrew Faile
Assistant Examiner—Hai V. Tran
(74) Attorney, Agent, or Firm—Ronald M. Anderson

(57) ABSTRACT

Wireless communication protocol for enabling unidirectional communications in a simplex environment, or bidirectional communications in a duplex environment, between a controller and one or more controlled devices. The controller transmits video data and control data that may include voice synthesis coefficients and motor movement coefficients for processing by the controlled devices. The video data drives a display device to depict a scene, and the control data drives the controlled devices so that the controlled devices behave as characters in the scene depicted on the display device. Each controlled device is operable for recognizing messages directed to the device and for parsing these messages into control signals for a number of end effectors, such as speech synthesizers, servo motors, lights, heat sources, pumps, etc. The content of messages for, and the set of end effectors in, any particular controlled device may be changed so that the system is forwardly compatible for new controlled devices using the protocol.

73 Claims, 14 Drawing Sheets

PROTOCOL FOR A WIRELESS CONTROL SYSTEM

REFERENCE TO RELATED APPLICATIONS

This application is related to U.S. application Ser. No. 08/794,921, filed Feb. 4, 1997, now U.S. Pat. No. 6,317,714 issued Nov. 13, 2001; U.S. Application Ser. No. 08/795,698, filed Feb. 4, 1997, now U.S. Pat. No. 5,977,951 issued Nov. 2, 1999; and U.S. Application Ser. No. 08/795,711, filed Feb. 4, 1997, now U.S. Pat. No. 6,067,095, issued May 23, 2000, all assigned to the same assignee as the present application.

TECHNICAL FIELD

The present invention relates to wireless communication systems and, more particularly, relates to a wireless communication protocol that enables bidirectional communications for controlling synthesized speech and coordinated movement in a plurality of low-cost devices using a single radio-frequency channel.

BACKGROUND OF THE INVENTION

A variety of consumer products available today rely upon the use of wireless communication. Examples include cordless phones, garage door openers, remotely controlled appliances, and remotely controlled toys. A common motivation that drives manufacturers of these and similar products is minimizing the cost associated with providing the wireless communication capability. Thus, techniques for minimizing the cost of radio equipment for transmitting and receiving radio frequency signals while maintaining reliable communication are continuously explored.

Interactive toys, games, and learning products for the home could be particularly useful applications of wireless communication technology. Wireless systems eliminate the use of wire-line communication links and, therefore, are preferable for many household applications. For example, wireless toys, games, and learning products eliminate wires that small children might tangle or pull free, or that dogs might chew. Wireless products also avoid the need for universal plugs or adapters and allow a large number of wireless devices to be controlled by a single controller without requiring a large terminal port for plugging-in the controlled devices. Wireless communication links are therefore safer, more robust, more versatile, and in many cases less expensive than wire-line communication links.

There are a number of often competing objectives in designing wireless products, such as toys, games, and learning products, for use in a home environment. First, the entire system should be priced within an acceptable range for a children's entertainment product. Furthermore, because each child may desire new controlled devices over time, the cost of each controlled device should be as low as possible. This means that the controlled devices should include inexpensive wireless communication equipment, such as conventional amplitude modulation (AM) radio equipment and digital data handling equipment. Second, it is advantageous for several wireless devices to be controlled simultaneously by a single controller. In the context of a wireless toy environment, this allows several children to interact with their own toys at the same time. For example, one child may interact with a "FRED" toy, while another interacts with a "WILMA" toy, while another interacts with a "DINO" toy, etc. In addition, it is advantageous for a variety of different toys to be available so that children have a selection of toys to choose from and collect. Moreover, in a progressive learning system, it is advantageous to have a series of toys associated with different skills so that a child can progress through the skills learned by interacting with the different toys.

Third, it is advantageous for the controller and the controlled devices to be operable for engaging in bidirectional communications. This is particularly useful in an interactive learning environment in which a child interacts with a controlled device. For example, the controller may direct a controlled doll to say, "Please squeeze my left hand." The controlled doll may then transmit the child's response back to the controller, which responds accordingly. For example, if the child squeezes the doll's right hand, the controller directs the doll to say, "No that's my right hand, please squeeze my left hand."

A fourth consideration is forward compatibility. This means that the original controller can be used to operate future versions of controlled devices. For example, an interactive toy product may initially be introduced with only one or two controlled devices (e.g., "FRED" and "WILMA"). But over the next several years, dozens of new controlled products may be released to upgrade the system (e.g., "DINO," "BAM-BAM," etc.). Forward compatibility allows the new controlled devices to be operated by the original controller.

These and other desirable attributes of the wireless system should be attained within severe bandwidth limitations. Governmental regulations over the radio-frequency spectrum limits the amount of the spectrum that may be allocated to devices such as toys, games, and learning products. In fact, the Federal Communications Commission (FCC) has allocated only a few radio-frequency channels for low cost consumer products. Because several widely-used products fall into this category, such as cordless telephones and garage door openers, crosstalk and interference between these devices and newly-introduced wireless products should be avoided. The amount of the radio-frequency spectrum used by the newly-introduced wireless products should therefore be minimized. In fact, the newly-introduced wireless products should preferably use a single radio-frequency channel.

There is, therefore, a need for inexpensive wireless products, such as toys, games, and learning products, for use in a home environment. There is a further need for a wireless communication system in which several wireless devices may be controlled simultaneously by a single controller. There is a further need for a wireless communication system in which the controller and the controlled devices are operable for engaging in bidirectional communications. There is a further need for a wireless communication system configured for forward compatibility. These and other desirable attributes of the wireless system should be attained within severe bandwidth limitations, such as a single radio-frequency channel.

SUMMARY OF THE INVENTION

The present invention meets the needs described above by providing a wireless communication protocol that enables unidirectional communications in a simplex environment, or bidirectional communications in a duplex environment, between a controller and one or more controlled devices. The controller receives or generates video data and control data that may include voice synthesis coefficients and motor movement coefficients for the controlled devices. The video data drives a display device to depict a scene, and the control data drives the controlled devices so that the controlled devices behave as characters in the scene depicted on the display device. Each controlled device is operable for recognizing messages directed to the device and for parsing these messages into control signals for a number of end effectors, such as speech synthesizers, servo motors, lights, heat sources, pumps, etc. The content of messages for, and the set of end effectors in, any particular controlled device may be changed so that the system is forwardly compatible for new controlled devices using the protocol.

Generally described, in a simplex environment, a controller transmits an acquisition message from the controller to a controlled device including a transmitted device code and a subchannel address. The controlled device compares the assigned device code to the transmitted device code and, if the assigned device code corresponds to the transmitted device code, stores the subchannel address as an assigned subchannel address. The controller then transmits a control data packet to the controlled device including a message header, which includes a message subchannel address, and control data. The controlled device compares the assigned subchannel address to the message subchannel address and, if the assigned subchannel address corresponds to the message subchannel address, responds to the control data. To reduce the bandwidth requirement for the control data packet, the subchannel address consists of substantially fewer data bits than the assigned device code. For example, the subchannel address may include only three data bits, whereas the assigned device code may include at least sixteen data bits.

In a duplex environment, the controller transmits an acquisition message from the controller to the controlled device including a transmitted device code. The controlled device compares the assigned device code to the transmitted device code and, if the assigned device code corresponds to the transmitted device code, transmits a response message to the controller including a device identifier that may be based on a random number or an electronic tag set during manufacturing, such as an electronic serial number, or by user settings. The response message may also be delayed by a delay period based on a random number. The controller transmits a verification message to the controlled device including a transmitted identifier and a subchannel address. The controlled device compares the transmitted identifier to the device identifier and, if the transmitted identifier corresponds to the device identifier, the controlled device stores the subchannel address as an assigned subchannel address.

According to an aspect of the invention, a controller for a wireless control system includes a processor for receiving a data stream including video data, encoded acquisition data, and encoded control data. The processor routes the video data to a display device coupled to the processor so that the display device depicts a scene. The processor also extracts the acquisition data from the data stream and routes the acquisition data to a protocol handler that is coupled to the processor. The protocol handler modulates a radio-frequency carrier to create an acquisition message including a device code associated with the controlled device and a subchannel address. A transmitter coupled to the protocol handler then transmits the acquisition message to the controlled device. The protocol handler also extracts the control data from the data stream, modulates the radio-frequency carrier to create a control data packet including a message header, which includes the subchannel address, and the control data. The transmitter then transmits the control data packet to the controlled device so that the controlled device behaves as a character in the scene depicted on the display device.

In a duplex environment, the controller also includes a receiver coupled to the protocol handler for receiving a response message from the controlled device including a device identifier. The protocol handler modulates the radio-frequency carrier to create a verification message including the device identifier and a subchannel address and transmits the verification message to the controlled device.

According to another aspect of the invention, a controlled device for a wireless control system includes a receiver for receiving an acquisition message from a controller including a transmitted device code and a subchannel address. The controlled device also includes a processor coupled to the receiver for comparing the assigned device code to the transmitted device code and, if the assigned device code corresponds to the transmitted device code, storing the subchannel address as an assigned subchannel address. The receiver also receives a control data packet from the controller including a message header, which includes a message subchannel address, and control data. The processor compares the assigned subchannel address to the message subchannel address and, if the assigned subchannel address corresponds to the message subchannel address, responds the control data.

For example, the control data may include voice synthesis coefficients, and the controlled device may include a voice synthesizer for synthesizing voice sounds based on the voice synthesis coefficients so that the controlled device behaves as a character in a scene depicted on a display device coupled to the controller. In addition, the control data may include motor movement coefficients, and the controlled device may include a motor for operating an end effector based on the motor movement coefficients so that the controlled device behaves as a character in a scene depicted on a display device coupled to the controller.

In a duplex environment, the controlled device also includes a random number generator coupled to the processor. If the assigned device code corresponds to the transmitted device code, the processor generates a device identifier based on a random number. Alternatively, the device identifier may be either by an electronic tag set during manufacturing, such as an electronic serial number, or by user settings. The processor also delays transmission of the response message by a delay interval based on a random number. The controlled device also includes an elastic queue for storing the voice synthesis coefficients and providing the voice synthesis coefficients to the voice synthesizer so that the controlled device generates voice sounds based on the voice synthesis coefficients while the controlled device transmits the receptor data response message to the controller. This allows the controlled device to generate voice sounds continuously while the controller and the controlled device engage in bidirectional communications on a single radio-frequency channel.

In summary, the protocol allows the controller to assign subchannels to the controlled devices so that several devices may be controlled simultaneously by a single controller. The use of subchannels advantageously reduces the bandwidth required so that synthesized speech and coordinated movement may be controlled in a plurality of low-cost devices using a single radio-frequency channel. In a duplex environment, the controller assigns a subchannel to a controlled device in an acquisition handshake that may include an acquisition message from the controller to the controlled device, a response message back to the controller, and a verification message to the controlled device.

The acquisition message typically includes a device code corresponding to a genus of controlled devices. Each controlled device of the genus includes a device identifier based on a random number in its response message so that the controller can distinguish among the responding devices. Alternatively, the device identifier may be either by an electronic tag set during manufacturing, such as an electronic serial number, or by user settings. Each controlled device of the genus also delays its response message by a delay interval based on a random number to avoid message collision. The controller then acquires one of the responding devices by including that device's identifier in the verification message. Once a controlled device is acquired, the controlled device may store voice coefficients received from the controller in an elastic queue so that the controlled device may generate voice sounds continuously while the controller and the controlled device engage in bidirectional communications on a single radio-frequency channel.

That the invention improves over the drawbacks of the prior art and accomplishes these advantages will become apparent from the following detailed description of the exemplary embodiments and the appended drawings and claims.

DETAILED DESCRIPTION

Figure 1:
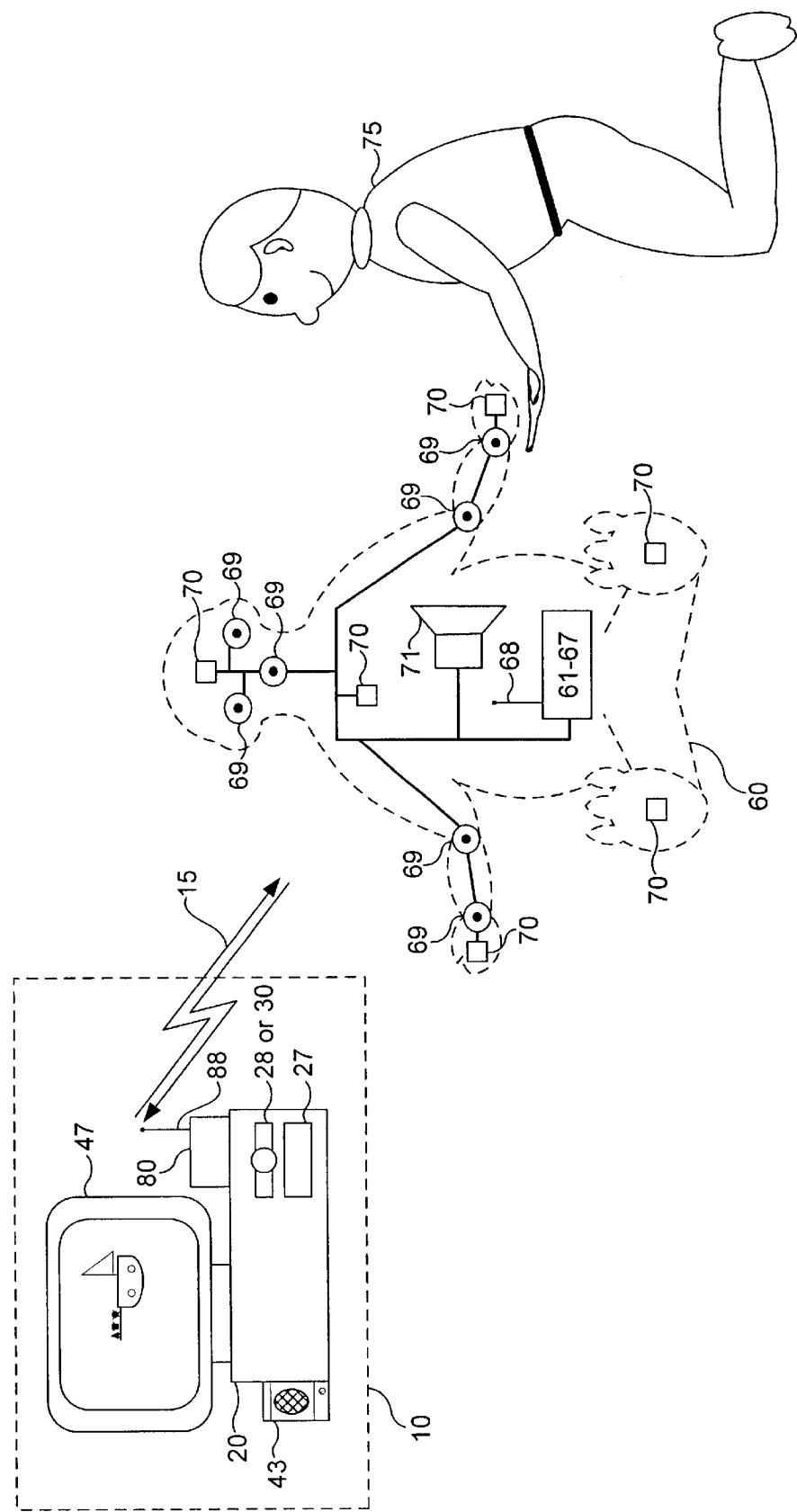
FIG. 1 is a block diagram of a duplex wireless control environment including a controller and a controlled device.

The present invention includes a wireless communication protocol that enables unidirectional communications in a simplex environment, or bidirectional communications in a duplex environment, between a controller and one or more controlled devices. The controller receives or generates video data and control data that may include voice synthesis coefficients and motor movement coefficients for the controlled devices. The video data drives a display device to depict a scene, and the control data drives the controlled devices so that the controlled devices behave as characters in the scene depicted on the display device. Each controlled device is operable for recognizing messages directed to the device and for parsing these messages into control signals for a number of end effectors, such as speech synthesizers, servo motors, lights, heat sources, pumps, etc. The content of messages for, and the set of end effectors in, a particular controlled device may be changed so that the system is forwardly compatible for new controlled devices using the protocol.

According to the protocol, the controller assigns subchannels to the controlled devices so that several devices may be controlled simultaneously by a single controller. The use of subchannels advantageously reduces the bandwidth required so that synthesized speech and coordinated movement may be controlled in a plurality of low-cost devices using a single radio-frequency channel. In a duplex environment, the controller assigns a subchannel to a controlled device in an acquisition handshake that may include an acquisition message from the controller to the controlled device, a response message back to the controller, and a verification message to the controlled device.

The acquisition message typically includes a device code corresponding to a genus of controlled devices. Each controlled device of the genus includes a device identifier based on a random number in its response message so that the controller can distinguish among the responding devices. Alternatively, the device identifier may be either by an electronic tag set during manufacturing, such as an electronic serial number, or by user settings. Each controlled device of the genus also delays its response message by a delay interval based on a random number to avoid message collision. The controller then acquires one of the responding devices by including that device's identifier in the verification message. Once a controlled device is acquired, the controlled device may store voice coefficients received from the controller in an elastic queue so that the controlled device may generate voice sounds continuously while the controller and the controlled device engage in bidirectional communications on a single radio-frequency channel.

Exemplary Embodiment

The "REALMATION" System

The present invention may be deployed in a wireless communication environment that includes a controller (also referred to as a master device) that communicates with and controls one or more controlled devices (also referred to as slave devices) on a single radio-frequency (RF) communication channel. A specific embodiment of the invention is known as the "REALMATION" system. "REALMATION," derived from combining the words "realistic" and "animation," is descriptive of a new technology developed by Microsoft Corporation of Redmond, Wash. A controller in a typical "REALMATION" system includes a computer system with a display device and a wireless modem that communicates with and controls one or more controlled devices, such as animated mechanical characters. The controller drives a display device to depict scenes of an audio/video presentation while simultaneously transmitting control data, including voice coefficients and motion coefficients, to one or more mechanical characters. The mechanical characters, in response to receiving the control data, move and talk as characters in the scenes depicted on the display device.

Microsoft Corporation is developing a "REALMATION" product line that includes two main components: a controller (i.e., master device) known as the "REALMATION CONTROLLER," and one or more controlled devices (i.e., slave devices) known as "REALMATION PERFORMERS." A controlled device may be specially designed for a specific industrial, educational, research, entertainment, or other purpose. For example, a controlled device such as the "BARNEY" dinosaur character is specially designed for a learning and entertainment system for small children. Each controlled device includes an RF receiver system for receiving, demodulating, and decoding signals transmitted by the controller. The signals transmitted by the controller contain control data, such as speech coefficients and motion coefficients. The control data causes the controlled device to behave as a character in a scene depicted on a display device driven by the controller.

In a duplex environment, each controlled device may also include an RF transmitter system for encoding, modulating, and transmitting response signals back to the controller. These response signals may include test or receptor data defining status information concerning the controlled device. For example, a controlled device may include pressure or light sensitive receptors for receiving user input, such as squeezing or covering a part of the character. This is particularly useful in an interactive learning environment in which a child interacts with the controlled device. For example, the controller may direct a "BARNEY" controlled device to say, "Please squeeze my left hand." The controlled device may then transmit the child's response back to the controller, which responds accordingly. For example, if the child squeezes the controlled device's right hand, the controller may direct the controlled device to say, "No, that's my right hand, please squeeze my left hand."

The controller includes a data source that receives or generates video data and related control data so that one or more controlled devices may behave as characters in a scene depicted on a display device. To do so, the control system includes a wireless modem (or wireless modulator for a simplex environment), known as the "REALMATION LINK MASTER," and a display device, such as a television or a computer monitor. The data source may be an active device, such as computer system or an interactive television system, that generates the video data and related control data in real-time. Alternatively, the data source may be a passive device, such as a cable system, VCR, or television broadcast signal, that feeds a previously-created data stream including video data and encoded control data to the wireless modem. In this case, the wireless modem extracts the control data from the data stream, feeds the video data to the display device, and broadcasts the control data to one or more controlled devices.

In addition, the controller may be an intelligent system that is operative to generate, select, and combine video and control data from a number of sources in response to user input or other control signals. Regardless of the configuration, some type of data source provides a data stream including video and related control data, and the wireless modem extracts the control data from the video data, routes the video data to the display device, and broadcasts the control data to one or more controlled devices. To broadcast control data, the wireless modem encodes the control data into a special differential-data modulation (DDM) format and transmits the DDM-encoded control data to the controlled devices. In addition, the wireless modem may receive DDM-encoded response signals from the controlled devices and decode the response signals.

The "REALMATION" product line may operate in a simplex environment or in a duplex environment. The operation of exemplary embodiments of the controller, the wireless modem (or modulator), and the controlled devices in these environments will be described in the context of programs running on microprocessor-based computer systems. Those skilled in the art will recognize that implementations of the present invention may include various types of program modules, use various programming languages, and be operable with various types of computing equipment. Additionally, although the descriptions of exemplary embodiments describe the controller as communicating with a controlled device over an RF communication channel, those skilled in the art will appreciate that substitutions to the RF communication channel can include other communication mediums such as fiber optic links, copper wires, infrared signals, etc.

Generally, a program, as defined herein, includes routines, subroutines, program modules, components, data structures, etc., that perform particular tasks or implement particular abstract data types. Moreover, those skilled in the art will appreciate that aspects of the present invention are applicable to other computer system configurations. These other computer system configurations include but are not limited to hand-held devices, multiprocessor systems, microprocessor-based or programmable consumer electronics, minicomputers, mainframe computers, and the like. Aspects of the present invention are also applicable within the context of a distributed computing environment, such as the Internet, in which tasks may be performed by remote processing devices that are linked through a communications network. In a distributed computing environment, program modules may be located in both local and remote memory storage devices.

In both the simplex and duplex environments, the controlled devices may be low-cost, animated, mechanical characters intended for use in an interactive learning and entertainment environment for children. At minimum, each controlled device includes a receiver system, a speech synthesizer, a speaker, a processor, and one or more servo motors. But a controlled device may include many other types of end effectors, such as light sources, heat source, inflatable devices, pumps, and so forth. Indeed, the protocol for the wireless control system is designed to be forwardly compatible with a wide range of controlled devices that may be developed in the future. In response to the receiver system receiving control data on a predefined RF channel, the processor decodes, interprets, and responds in a manner dictated by the contents of the control data. The response of the processor may include actuating one or more servo motors, providing input to the speech synthesizer, or activating any of the other end effectors provided in a particular controlled device.

In the duplex environment, the controlled devices may also include one or more sensor devices and a transmitter system. The sensor devices typically detect actions such as a child squeezing the hand, covering the eyes, or changing the position of the controlled device. By monitoring output signals from the sensors, the processor collects status information. Upon receiving a request from the controller, the processor can transmit the sensor status information to the controller. In response to receiving the sensor status information, the controller may alter the animated audio/ video presentation in a manner commensurate with the information. For example, in response to the action of a child covering the eyes of the controlled device, the audio/video presentation may switch to a game of peek-a-boo.

Thus, in the duplex environment, the controller engages in bidirectional communication with one or more controlled devices. Although the description of the duplex environment of the controller describes a program running on a personal computer and cooperating with another program running on a microprocessor-based communication device, those skilled in the art will recognize that other implementations, such as a single program running on a stand-alone platform, a distributed computing device equipped with radio communication equipment, or an interactive television system, may also suffice.

In the simplex environment, the controller engages in unidirectional communication with one or more controlled device. Although the description of the simplex environment of the controller describes a video cassette recorder (VCR) or a cable television box interfacing with a program running on a microprocessor-based communication device, those skilled in the art will recognize that other implementations, such as direct broadcasting signals, laser disc players, video tape players, computing devices accessing CD-ROM's, etc., may also suffice. In addition, the simplex environment may include integrating a VCR or similar device with a microprocessor-based communication device for operating in a stand-alone configuration.

The detailed description that follows is represented largely in terms of processes and symbolic representations of operations by conventional computer components, including a microprocessor unit (MPU), memory storage devices for the MPU, display devices, output control signals, and input devices. Furthermore, these processes and operations may utilize conventional computer components in a heterogeneous distributed computing environment, including remote file servers, remote computer servers, and remote memory storage devices. Each of these conventional distributed computing components is accessible by the MPU through a communications network.

The processes and operations performed by the computer include the manipulation of signals by a MPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, flags, variables, parameters, objects, properties, tags, types, identifiers, values, elements, symbols, characters, terms, numbers, points, records, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as adding, comparing, receiving, sending, transmitting, replying, etc., which are often associated with manual operations performed by a human operator. The operations described herein are machine operations performed in conjunction with various inputs provided by a human operator or user that interacts with the computer.

In addition, those skilled in the art will understand that the programs, processes, methods, etc., described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein. The specialized apparatus could consist of dedicated computer systems in a specific network architecture with hard-wired logic or programs stored in nonvolatile memory, such as read only memory, magnetic storage devices, or optical storage devices.

The communication between the master and slave devices will be described in the context of RF signal transmissions formed in accordance with amplitude modulation (AM) techniques. The RF signals are used to transfer symbolic representations of digital information from one device to another. The RF signals are generated by modulating the amplitude of a carrier signal in a predetermined manner based on the value of a symbolic representation of the digital data. Those skilled in the art will understand that a variety of communication technologies may be utilized for transmitting the information between these devices and that describing the use of AM techniques should not restrict the principles of any aspect of the present invention.

Referring now to the drawings, in which like numerals represent like elements throughout the several figures, aspects of the present invention and exemplary operating environments will be described. Reference is made to FIGS. 1–7 below to provide a description of suitable environments in which the invention may be implemented. Reference is then made to FIGS. 8–14 to describe the preferred wireless communication protocol for controllers and controlled devices in these environments.

Duplex Environment

FIG. 1 illustrates an exemplary duplex environment for embodiments of the present invention. This duplex environment may be operated as an interactive learning and entertainment system for a child. The duplex environment includes a controller 10 that controls and interacts with a controlled device 60. The controller 10 includes a conventional personal computer 20, a wireless modem 80, an antenna 88, a speaker 43, and a display device 47. The personal computer 20 may include a hard disk drive 27, a magnetic disk drive 28, and/or an optical disk drive 30.

During operation, the controller 10 drives an audio/video presentation on the display device 47 and the speaker 43. In addition, the controller 10 transmits message packets that may include control data to the controlled device 60. The control data typically includes voice synthesis coefficients and motor coefficients for controlling the operation of the controlled device 60. The process of transmitting the control data includes building a data stream using the proper protocol, modulating a carrier with the data stream, and emitting the modulated carrier as an RF signal from the antenna 88 over the RF communication channel 15. More specifically the controller 10 includes a muiltimedia personal computer system 20 and a wireless modem 80. The computer system 20 passes the control data to the wireless modem 80 through a wired connection between the wireless modem 80 and the game (MIDI) port of the computer system 20. The wireless modem 80 then builds the data stream using the proper protocol, modulates a carrier with the data stream, and emits the modulated carrier over the RF communication channel 15.

The controlled device 60 receives the RF signals from the controller at the antenna 68. The receiver system 61–67 processes the received RF signals to recover the control data. The controlled device 60 interprets the received control data and responds to the control data by controlling the operation of one or more servo motors 69 or other end effectors within the controlled device 60, which includes providing speech data to be audibly presented by the speaker 71. Thus, transmitting the appropriate control data to the controlled device 60 causes the controlled device 60 to move and talk as though it is a character in the audio/video presentation.

The controlled device 60 also includes light sensors and touch sensors 70. In response to a child touching, squeezing, or moving the controlled device 60 in an appropriate manner, the light sensors and/or touch sensors 70 within the controlled device 60 generate status information. In response to a command from the controller 10, the controlled device 60 transmits the status information over the RF communication channel 15 back to the wireless modem 80 for processing by the controller 10. In response to receiving and interpreting the status information, the controller 10 may alter the progression of the audio/video presentation in a manner commensurate with the status information.

Figure 2:
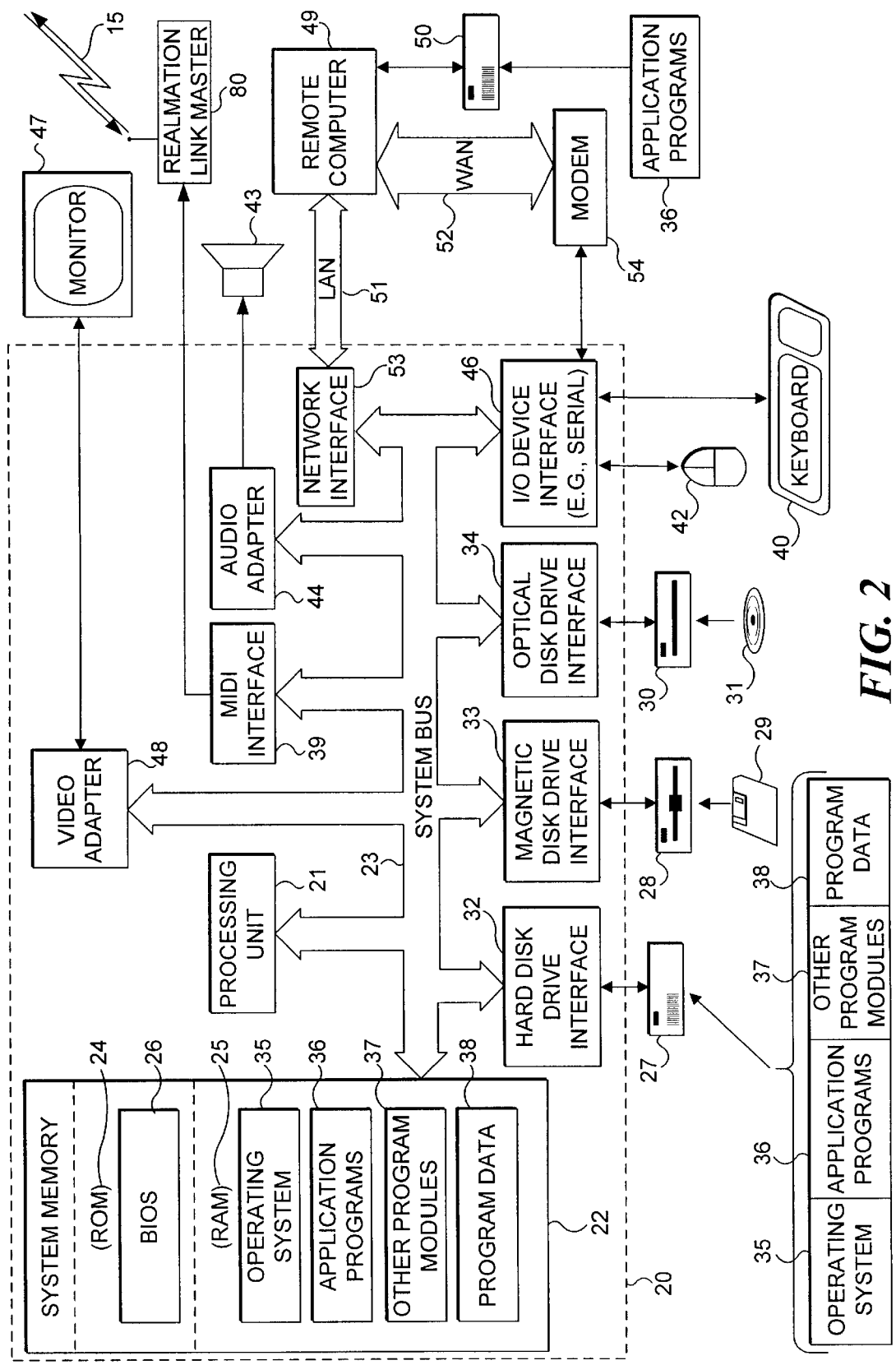
FIG. 2 is a block diagram of the personal computer that forms a part of the controller of FIG. 1.

FIG. 2 illustrates an exemplary computer system for implementing the controller 10 in the duplex environment illustrated in FIG. 1. The exemplary computer system includes a conventional personal computer 20, including a processor 21, a system memory 22, and a system bus 23 that couples the system memory to the processor 21. The system memory 22 includes a read only memory (ROM) 24 and a random access memory (RAM) 25. The ROM 24 provides storage for a basic input/output system 26 (BIOS), containing the basic routines that help to transfer information between elements within the personal computer 20, such as during start-up. The personal computer 20 further includes a hard disk drive 27, a magnetic disk drive 28 for reading from or writing to a removable disk 29, and an optical disk drive 30 for reading a CD-ROM disk 31 or for reading from or writing to other optical media. The hard disk drive 27, the magnetic disk drive 28, and the optical disk drive 30 interface to the system bus 23 through a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk, and a CD-ROM disk, those skilled in the art will understand that other types of media that are readable by a computer, such as magnetic cassettes, flash memory cards, digital video disks, Bernoulli cartridges, and the like, may also be used in the exemplary operating environment.

A number of program modules may be stored in the drives 27–30 and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, a joystick, a track ball, a light pen, a game pad, a scanner, a camera, or the like. These and other input devices are often connected to the processor 21 through a serial port interface 46 that is coupled to the system bus, but may be connected by other interfaces, such as a game port or a universal serial bus (USB). A computer monitor 47 or other type of display device is also connected to the system bus 23 via an interface, such as a video adapter 48. One or more speakers 43 are connected to the system bus via an interface, such as an audio adapter 44. In addition to the monitor and speakers, personal computers typically include other peripheral output devices (not shown), such a printers and plotters.

The personal computer 20 may operate in a networked environment using logical connections to one or more remote computers, such as a remote computer 49. Although only a memory storage device 50 has been illustrated in FIG. 2, the remote computer 49 may be a server, a router, a peer device, or other common network node, and typically includes many or all of the elements described relative to the personal computer 20. The logical connections depicted in FIG. 2 include a local area network (LAN) 51 and a wide area network (WAN) 52. These types of networking environments are commonplace in offices, enterprise-wide computer networks, intranets, and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules that may be accessed by the personal computer 20, or portions thereof, may be stored in the remote memory storage device. The network connections shown are exemplary and other means of establishing communications links among the computers may be used.

The personal computer 20 contains a musical instrument digital interface (MIDI) adapter 39, which allows the MPU 21 to control a variety of MIDI compatible devices (e.g., electronic keyboards, synthesizers, etc.) The MIDI adapter may also allow the MPU 21 to control a wireless modem 80. The MIDI adapter operates by receiving data over the system bus 23, formatting the data in accordance with the MIDI protocol, and transmitting the data over a MIDI bus 45. The equipment attached to the MIDI bus detects the transmission of the MIDI formatted data and determines whether the data is to be accepted and processed or ignored. That is, the wireless modem 80 examines the data on the MIDI bus and only processes data that explicitly identifies the wireless modem 80 as the intended recipient. In response to receiving data, the wireless modem 80 may transmit the data, such as control data intended for one or more controlled devices, over the RF communication channel 15.

Figure 3:
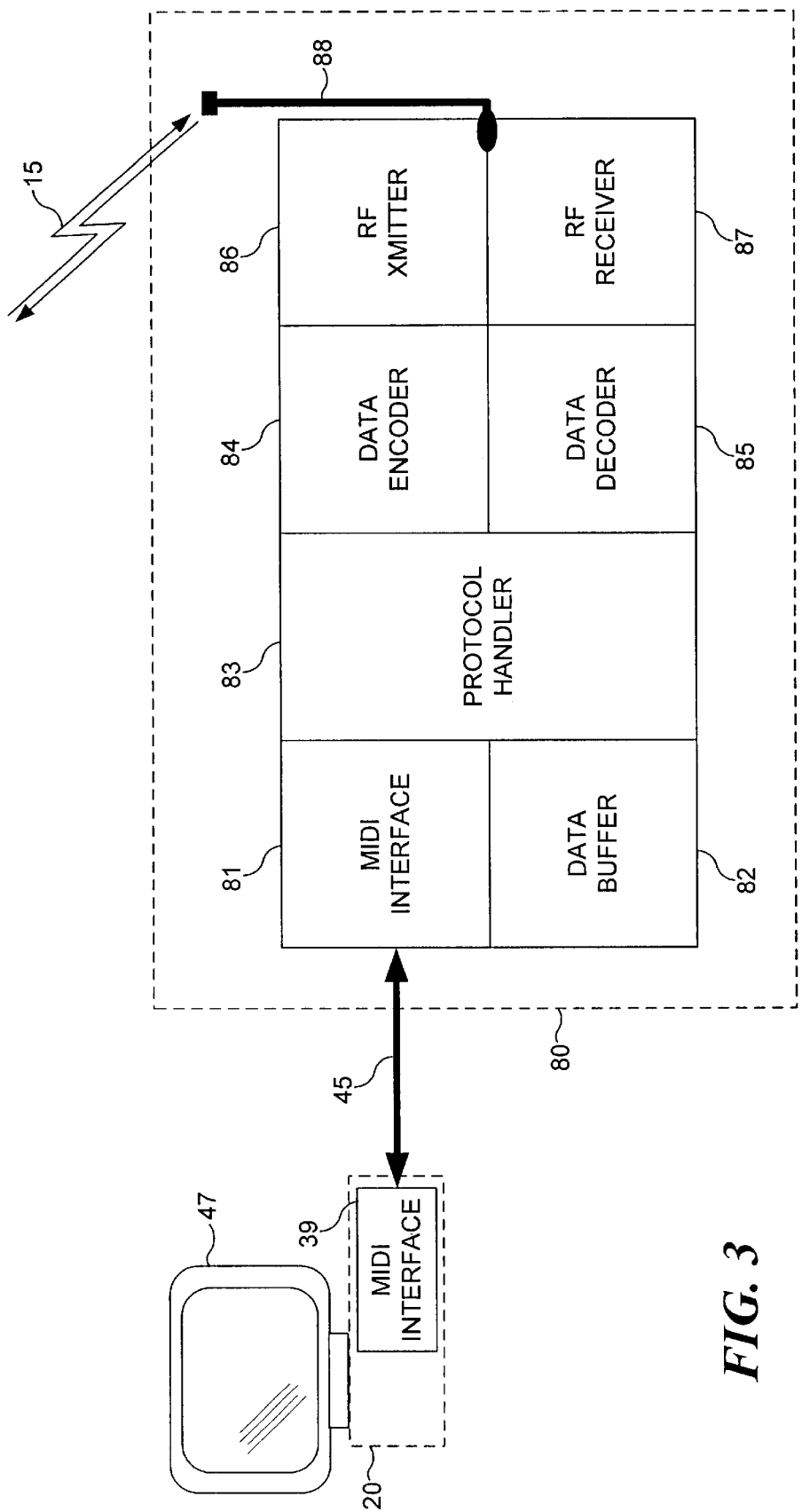
FIG. 3 is a block diagram of a wireless modem that forms a part of the controller of FIG. 1.

FIG. 3 is a block diagram illustrating the various components that define the wireless modem 80. Initially, a program running on the computer 20 obtains control data by generating the data or retrieving the data from a storage media accessible to the computer 20. In addition, the program may format the control data in accordance with a predefined protocol, such as a specific "REALMATION" protocol. Or in the alternative, the program may retrieve preformatted control data from a storage media. The program transfers the control data to the wireless modem 80 over the MIDI interface including the MIDI adapters 39 and 81 and the MIDI bus 45. This process includes repackaging the control data into the MIDI format. Those skilled in the art will appreciate that the MIDI interface is only one of several possible interfaces that can be used to transfer control data between the computer 20 and the wireless modem 80. Alternative interfaces include, but are not limited to, interfaces such as RS232, Centronix, and SCSI.

The protocol handler 83 receives the MIDI formatted data from the MIDI adapter 81 and removes the MIDI formatting to recover the control data. During this process, the protocol handler 83 may temporarily store the control data and or the MIDI formatted data in the data buffer 82. The protocol handler 83 may also perform other manipulations on the control data in preparation for transmitting the data. Before transmitting the control data, the data encoder 84 encodes the control data and provides the encoded control data to the RF transmitter 86. The RF transmitter uses the encoded control data to modulate a carrier and then transmits the modulated carrier over the RF communications channel 15 from the antenna 88.

The wireless modem 80 may also receive signals carrying response data originating from one or more controlled devices 60 or other devices. The wireless modem 80 detects these signals at the antenna 88 and provides the signals to the RF receiver 87. The RF receiver 87 demodulates the received signals, recovers the encoded response data, and provides the encoded response data to the data decoder 85. The data decoder 85 decodes the encoded response data and provides the decoded response data to the protocol handler 83. The protocol handler 83 formats the decoded response data into the MIDI format and transfers the MIDI formatted data to the computer 20 through the MIDI interface 81. The protocol handler 83 and or the MIDI interface 81 may temporarily store the response data in the data buffer 82 during processing. Upon receiving the information at the MIDI Interface 39, the computer 20 recovers the response data from the MIDI formatted data and then processes the response data.

Simplex Environment

Figure 4:
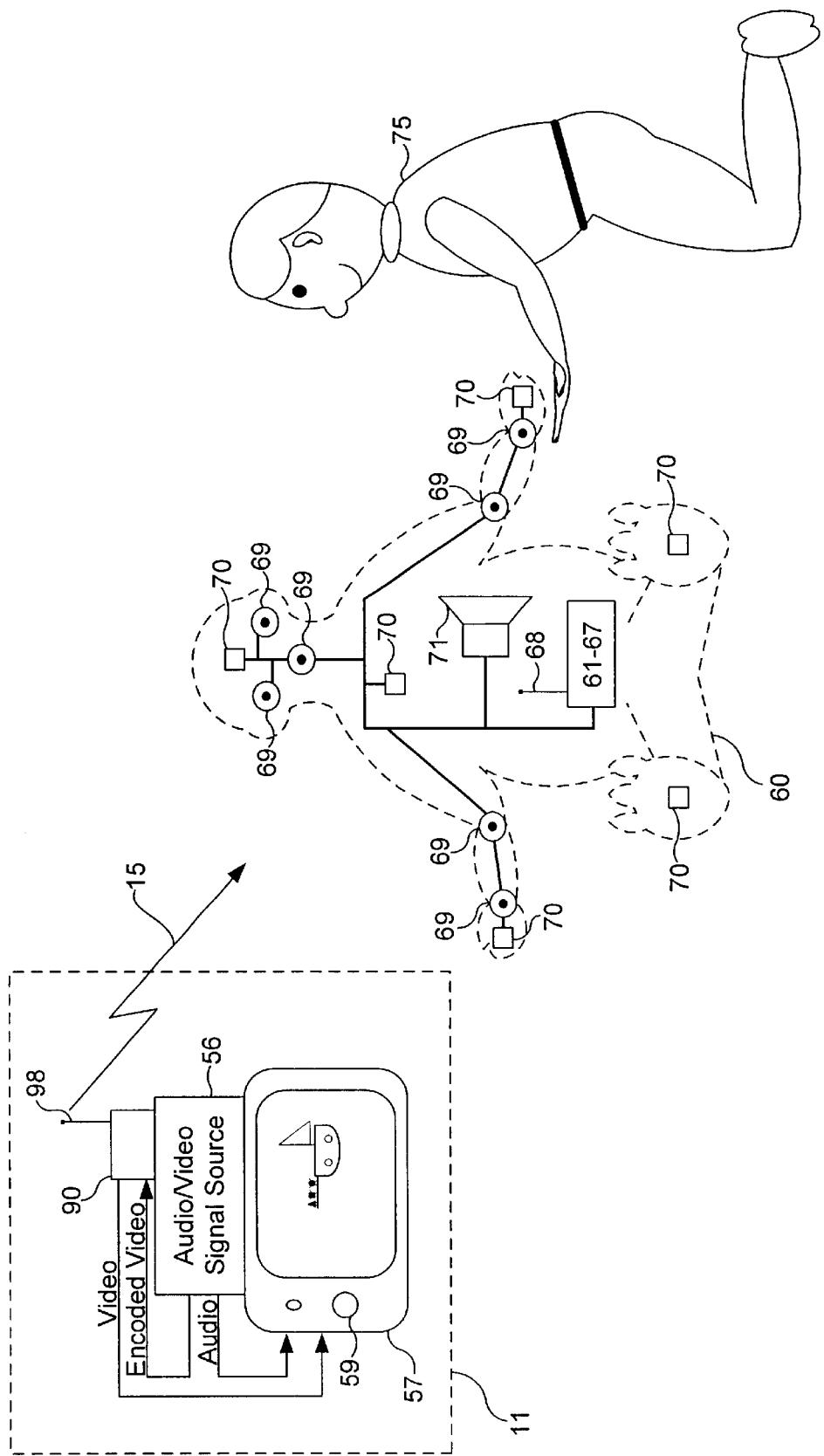
FIG. 4 is a block diagram of a simplex wireless control environment including a controller and a controlled device.

FIG. 4 illustrates an exemplary simplex environment for embodiments of the present invention. This simplex environment may be operated as a learning and entertainment system for a child. The simplex environment includes a controller 11 that controls a controlled device 60. The controller 11 includes an audio/video signal source 56, a wireless modulator 90, an antenna 98, and a display device 57 including a speaker 59. The controller 11 transmits control data to the controlled device 60 via an antenna 98 and an RF communication channel 15. To accomplish this task, the wireless modulator 90 interfaces with the audio/video signal source 56 and the display device 57 through a standard video interface. Over this standard video interface, the wireless modulator 90 receives a video signal encoded with control data (Encoded video) from the audio/video signal source 56. The wireless modulator 90 extracts the control data from the Encoded video signal, and then transfers the control data to a controlled device 60 through the RF communication channel 15.

In addition, the wireless modulator 90 passes the video signal to the display device 57. The audio/video signal source 56 also interfaces with the speaker 59 in the display device 57. Over this interface, the audio/video signal source 56 provides audio for an audio/video presentation. Thus, a child can observe the audio/video presentation on the display device 56 and the speaker 59 while the wireless modulator 90 transmits control data to one or more controlled device 60. The reception of the control data causes the controlled device 60 to move and talk as though it is a character in the audio/video presentation.

There is no need to modify the Encoded video signal before passing it to the display device 57. Typically, the controller 11 receives the Encoded video signal, which is a standard video signal that has been modified to include digital information in the horizontal overscan intervals of the scan lines, which are invisible to the display device 57. Thus, the display device 57 can receive and display the Encoded video signal without modification. The controller 11 only needs to extract the control data from the Encoded video signal and generate the RF-modulated control signals for transmission to the controlled device 60.

Figure 5:
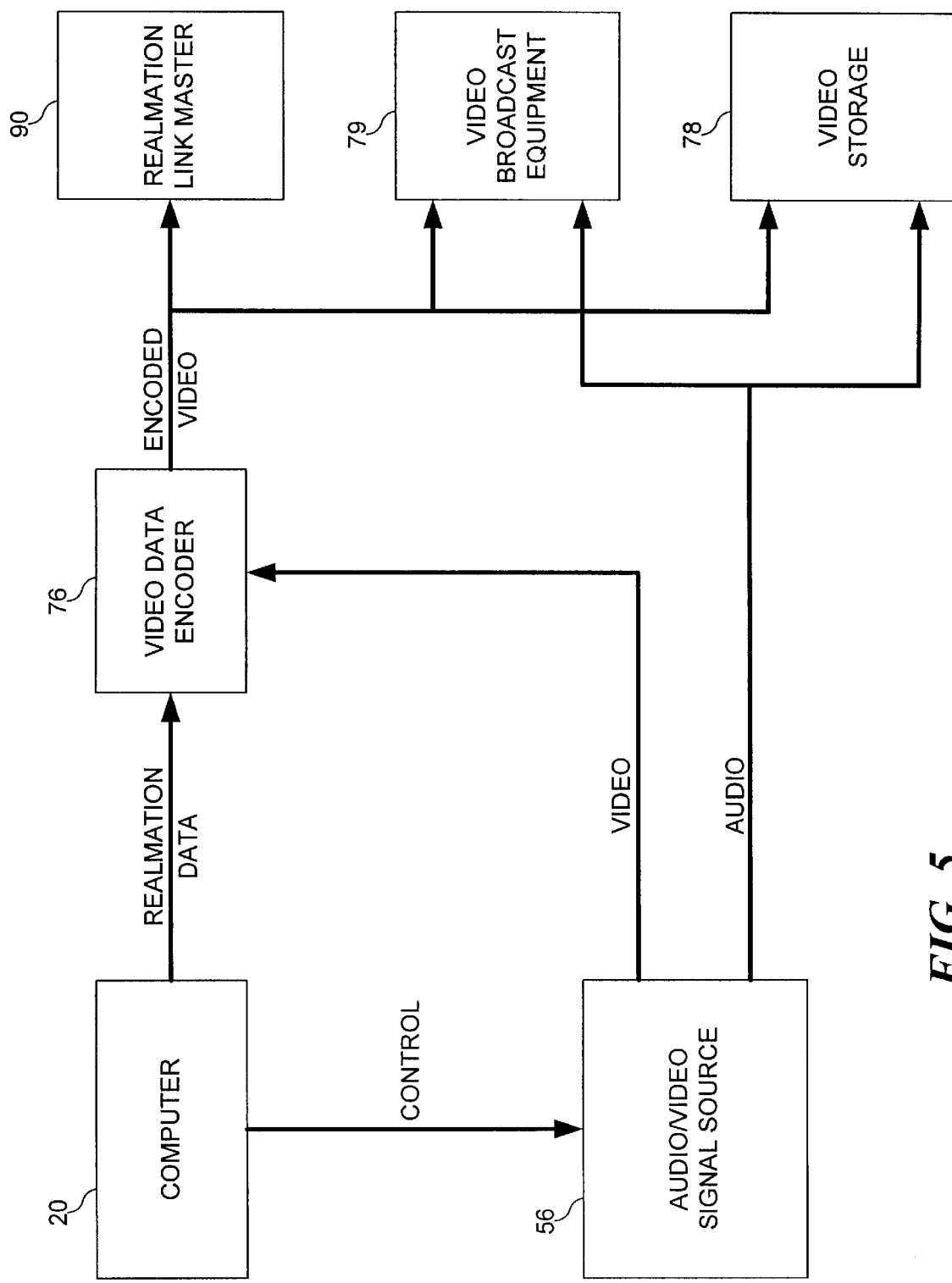
FIG. 5 is a block diagram illustrating a system for creating a data stream including video data and encoded control data.

A variety of sources, including but not limited to, a video cassette recorder or player, a cable reception box, a TV tuner, a laser disc player, or a computer with a video output, may provide the Encoded video. FIG. 5 is a block diagram illustrating a system for creating an Encoded video data stream including video data and encoded control data. In FIG. 5, the computer system 20 interfaces with a video data encoder 76 and an audio/video signal source 56. The audio/video signal source 56 provides two output signals: video and audio. These output signals may include live camera feeds, prerecorded playbacks, broadcast reception, etc. The computer system 20 controls the operation of the audio/video source 56 via a control signal. The control signal gates the output of the video and audio signals from the audio/video signal source 56.

The computer system 20 also provides the control data, which is encoded onto the video signal. The computer system 20 transfers the control data and gates the video signal to the video data encoder 76. The video data encoder combines the video signal and the control data by encoding the control data onto the video signal (i.e., generating an Encoded video data stream). This encoding technique includes modulating the luminance of the horizontal overscan area of the video signal on a line-by-line basis. For example, the overscan area of each scan line may be modulated to represent a single control data bit. Furthermore, the field boundaries of the video signal provide a framing structure for the control data, in which each frame contains a fixed number of data words.

More specifically, each field of the video signal contains a pattern identification word consisting of four bits. The value of the pattern identification word in each contiguous field cyclically sequences through a defined set of values. The presence of the pattern identification word distinguishes an Encoded video signal from a normal video signal. In a normal video signal, random noise appears in place of the pattern identification word. A decoder attempting to recover control data from an Encoded video signal therefore determines whether the signal is an Encoded video signal by detecting the presence of the pattern identification. Thus, the pattern identification word provides an additional layer of integrity to the recovered control data beyond that of simple checksum error detection.

The wireless modulator 90 receives the Encoded video signal from the audio/video signal source 56 and recovers the control data from the Encoded video signal. The wireless modulator 90 then transmits the control data to one or more controlled device, represented by the controlled device 60 shown in FIG. 4. Alternatively, video broadcast equipment 79 may receive the Encoded video signal along with the audio signal and then broadcast the signals to one or more remotely located wireless modulators and/or wireless modems. In another alternative, video storage equipment 78 may receive the Encoded video signal along with the audio signal and then store the signals in a storage medium for future retrieval.

Figure 6:
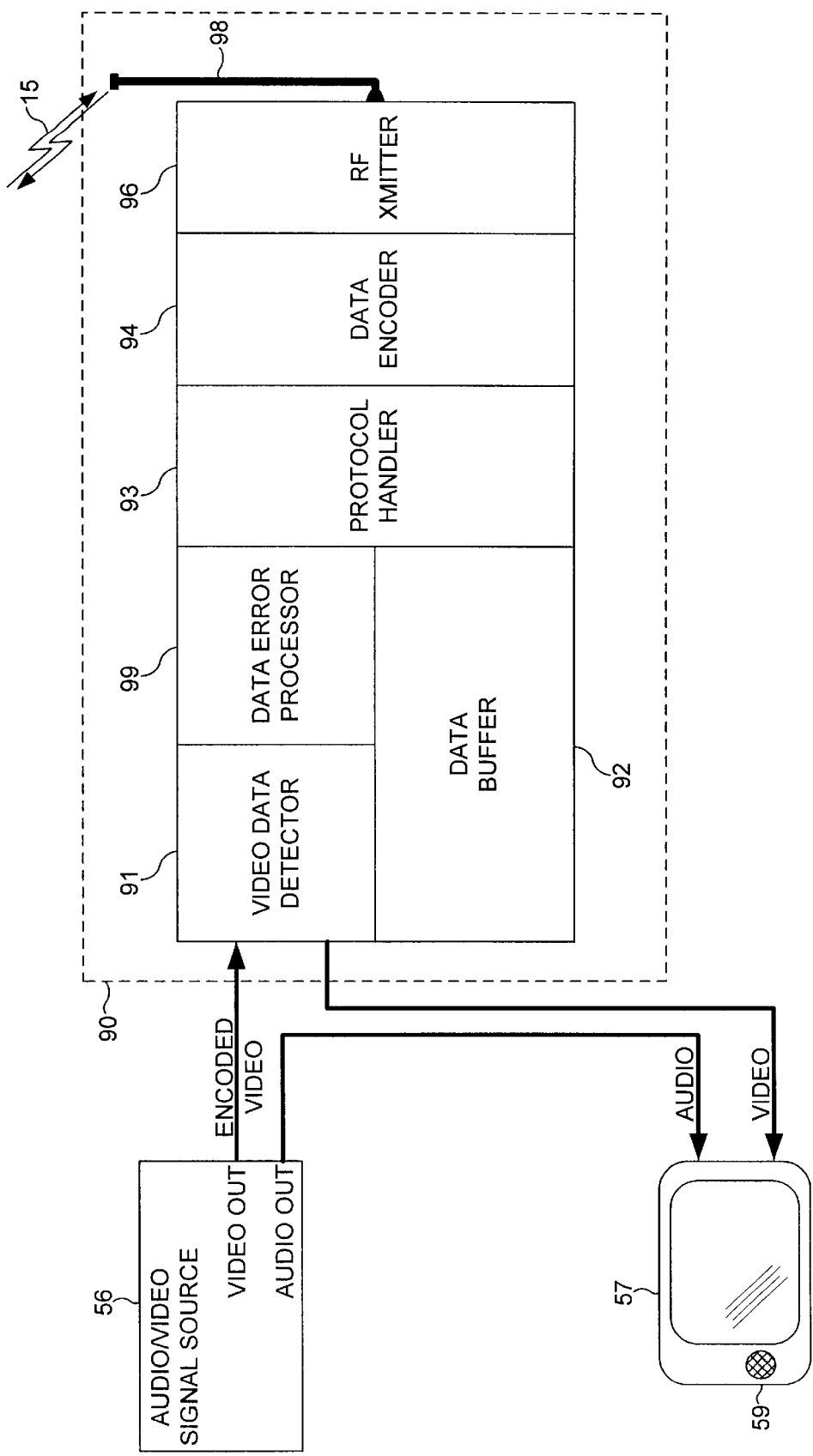
FIG. 6 is a block diagram illustrating the various components and processes that define a wireless modem that forms a part of the controller of FIG. 4.

FIG. 6 is a block diagram illustrating the various components that define the wireless modulator 90. Each of the components of the wireless modulator 90 may be implemented in hardware, software, or a combination of hardware and software. The video data detector 91 of the wireless modulator 90 receives a video signal, originating from an audio/video signal source 56, and identifies whether the video signal is an Encoded video signal. If the video data detector 91 detects the presence of the pattern identification word in the received video signal, then the video signal is an Encoded video signal. If the signal is an Encoded video signal, the video data detector 91 extracts the control data from the Encoded video signal, provides the control data to the data error processor 99, and simultaneously provides the video signal to the display device 57.

The data error processor 99 analyzes the control data to detect and attempt to correct any errors that may exist in the control data. After correcting any errors in the control data, the protocol handler 93 receives the recovered and verified control data and assembles message packets for transmission to one or more controlled devices, represented by the controlled device 60. Upon assembling a message packet, the protocol handler 93 provides the message packet to the data encoder 94. The data encoder 94 encodes the data and provides the encoded data to the RF transmitter 96. The RF transmitter 96 receives the encoded data and modulates a predefined RF carrier (i.e., a predefined RF channel approved for use in connection with the wireless communication system) with the encoded data. The RF transmitter then transmits the modulated carrier through the antenna 98. During processing of the control data, the various components of the computer system 20 or the wireless modulator 90 may temporarily store the control data in a data buffer, such as the representative data buffer 92.

The display device 57 receives the video signal from the video data detector 91 or another source along with an audio signal from the audio/video signal source 56. The display device 57 and the speaker 59 then display the audio/visual presentation defined by the video signal, typically including a series of scenes depicted on the display device 57 and the speaker 59, in a conventional manner.

As noted previously, the audio/video presentation on the display device 57 and the control data that is transmitted from antenna 98 are synchronized so that the controlled device 60 behaves as a character in the scene depicted on the display device 57. The processes of detecting the control data, correcting any errors, encoding the control data, and then modulating a carrier may introduce a slight delay. Nevertheless, embedding the control data within the video data in the Encoded video signal effectively synchronizes the operation of the controlled device with the scene depicted on the display device 57. In other words, the video signal received by the display device 57 and the control data transmitted from antenna 98 are synchronized because they are obtained from the same area of the original Encoded video signal, in which context sensitive control data is embedded within a video signal. Thus, the Encoded video signal may be separated in real-time into control data and related video data so that the controlled devices move and/or talk in a manner that relates to the audio/video presentation.

Controlled Devices

"REALMATION" Performers

Figure 7:
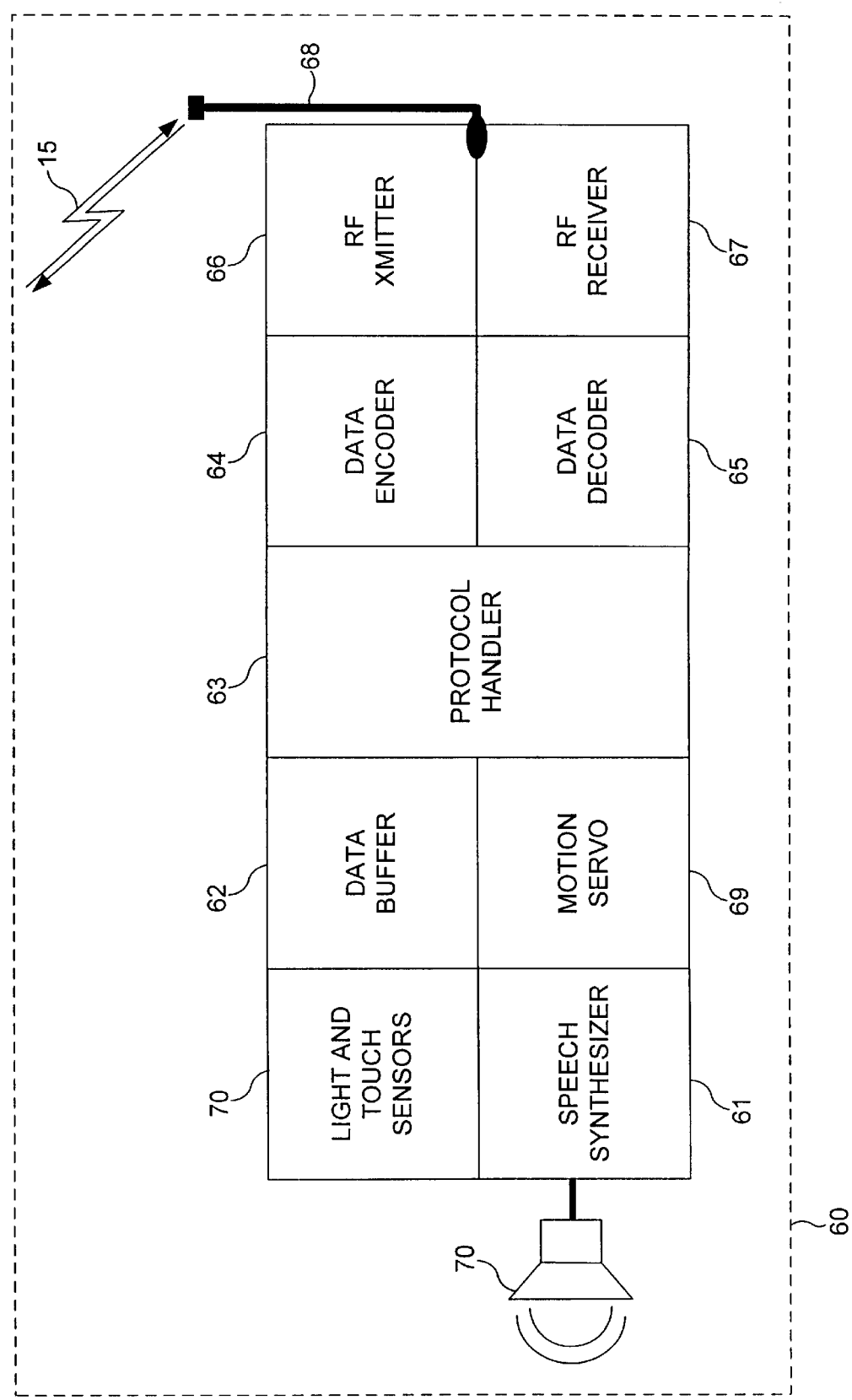
FIG. 7 is a functional block diagram illustrating the various components and processes that define the controlled device of FIG. 4.

FIG. 7 is a functional block diagram illustrating the various components that define a controlled device 60. Each of these components may be implemented in hardware, software, or a combination of hardware and software. Generally, the controlled device 60 includes a microprocessor, or some other type of other processor, for retrieving a program from a ROM, or some other type of non-volatile storage media, and executing the instructions of the program. The controlled device 60 may include hardware components such as an RF radio receiver 67, an RF transmitter 66, an antenna 68, a readable and writable storage memory 62, sensors 70, servo motors 69, a speech synthesizer 61, and a speaker 71.

The RF receiver 67 receives signals from the antenna 68. The RF receiver 67 operates on the received signal by demodulating the carrier and recovering encoded control data. Next, the data decoder 65 receives and decodes the encoded control data. The protocol handler 63 receives the decoded control data output from the decoder 65 and interprets the control data. Based on the content of the control data, the protocol handler 63 routes control data to the appropriate devices, such as data buffers and end effectors within the controlled device 60. Thus, if the control data contains motor movement coefficients, one or more of the motion servo motors 69 receives the control data, which causes them to move in accordance with the motor movement coefficients. Similarly, if the control data contains voice synthesis coefficients, the speech synthesizer 61 receives the voice synthesis coefficients, converts the voice synthesis coefficients into audio signals, and then provides the audio signals to the speaker 71. Furthermore, the voice synthesis coefficients may be temporarily stored in data buffer 62 so that the controlled device 60 generates voice sounds based on the voice synthesis coefficients while the controlled device 60 transmits response data back to the controller.

The controlled device 60 may also include light sensors and touch sensors 70. The sensors 70 may generate status information in response to variations in pressure, light, temperature, or other parameters. The controlled device 60 may transmit this status information to the controller 10 shown in FIG. 1. This process includes formatting the status information in the protocol handler 63, encoding the status information in the data encoder 64, modulating a carrier with the encoded status information in the RF transmitter 66, and then transmitting the modulated carrier over the RF communications path 15 through the antenna 68.

Wireless Communication Protocol

Figure 8:
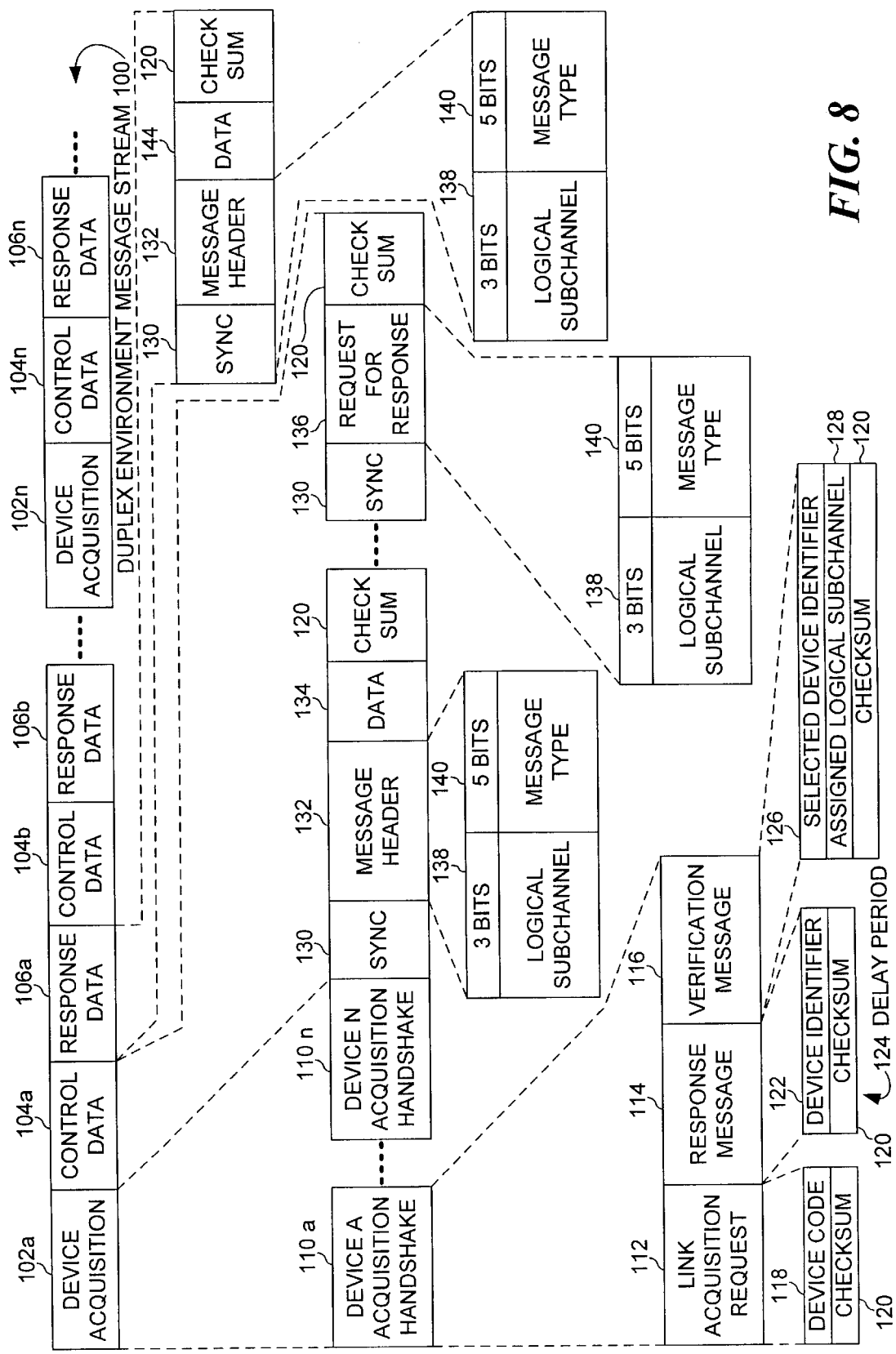
FIG. 8 illustrates the message stream in a duplex wireless control environment that includes a controller and a controlled device.

FIG. 8 illustrates a message stream 100 in a duplex wireless control environment, such as the environment illustrated in FIG. 2. The duplex wireless control environment includes a controller, such as the wireless modem 80, and a controlled device, such as the controlled device 60. The message stream 100 is specifically adapted for controlling a controlled device, such as a dinosaur "BARNEY" toy, in an interactive learning and entertainment system for a child. Those skilled in the art will understand that the specific messages and message components described below define this exemplary embodiment of the invention, and that other message formats and message components may be defined to perform similar and other functions for other controlled devices.

The message stream 100 includes a device acquisition segment 102a, in which the controller acquires one or more controlled devices, followed by a control data segment 104a, in which the controller transmits control data to one or more controlled devices, followed by a response data segment 106a, in which one or more controlled devices transmits response data back to the controller. The controller may later acquire another set of controlled devices in the acquisition segment 102n, which is followed by a control data segment 104n and a response data segment 106n. The controller may therefore control a plurality of controlled devices, represented by the controlled device 60, so that they behave as characters in scenes of an audio/visual presentation displayed on the display device 47, as described previously.

The control and response data segments 104a–106a may repeat an indefinite number of times, represented by the control and response data segments 104b–106b, in a half-duplex communication loop. During the data transmission portion of the half-duplex communication loop, the controlled device stores voice coefficients in an elastic queue so that it may generate voice sounds continuously while the controller and the controlled device engage in bidirectional communications on a single RF channel. Each cycle of the half-duplex communication loop preferably requires a relatively short period of time so that the operation of the controlled devices remains effectively synchronized with the audio/visual presentation displayed on the display device 47. In other words, the cycle period of the half-duplex communication loop should be short enough so that a user cannot perceive a loss of synchronism due to the temporary storage of voice coefficients in the elastic queue.

Specifically, the wireless communication protocol may be implemented as a differential-data modulation (DDM) scheme that utilizes a sync pulse, which is defined as a pulse of 2.5 standard pulse units (SPUs). The sync pulse, also referred to as a sync symbol, denotes the beginning of a new message packet. In the preferred DDM scheme, data is defined by changes in the widths of subsequent pulses as defined with respect to a standard pulse unit (SPU): 1.0 SPU=next bit different than previous; 1.5 SPU=next bit same as previous, following bit different than previous; 2.0 SPU=next two bits same as previous; and 2.5 SPU=sync symbol, reset previous bit to zero.

This DDM scheme is self-timing in that each sync pulse self-defines the duration of an SPU for the controller (i.e., SPU=sync duration divided by 2.5). This allows the controlled device to adjust for clock drifting that invariably occurs in the modem, and among various modems. The sync symbol also causes the controlled device to abort any partially decoded messages and to begin decoding a new message. This also allows the controlled device to resynchronize the message boundary and to recover from any decoding errors that may occur, such as decoding errors caused by interference on the RF channel.

The data transmission protocol may be based on a standard half-duplex communication loop selected for the specific transmitters and sensors in the "REALMATION" system. For example, the half-duplex communication loop may be a 320 ms cycle that includes a data transmission period followed by a data receipt period. The data transmission period begins with a 10 ms transmitter warm-up period, during which consecutive sync pulses are transmitted. The warm-up period is followed by a data transmission period that includes a number of message packets, such as 16 message packets. Each message packet includes a message header, followed by data (1.0, 1.5, or 2.0 DDM), followed by a checksum parameter, followed by one or two sync symbols. The data transmission period may be followed by a request for response message, which is followed by a 2 ms transmitter cool-down period.

The controller transmits voice data faster than the controlled device consumes the data. For example, voice data for the entire communication loop is typically transmitted during the data transmission period, which may last about one-half to two-thirds of the entire communication loop. The controlled device stores excess voice data received during the data transmission period in an elastic queue so that the controlled device may talk continuously throughout the communication loop, even though it only received data during the data transmission period. During the remaining portion of the communication loop, the controlled device depletes the data in the queue while it transmits a response message to the controller. This response message includes status information (i.e., current data) for the sensors of the controlled device, as well as change in status information (i.e., recent history data) for the sensors. By the time the response message has been transmitted, the data synthesizer queue is empty, and the communication loop repeats.

The representative device acquisition segment 102a includes one or more device acquisition handshakes 110a–n. The representative acquisition handshake 110a includes a link acquisition request message 112 transmitted from the controller to one or more controlled devices, a response message 114 transmitted from one or more controlled devices back to the controller, and a verification message 116 transmitted from the controller to one or more controlled devices that have been selected for acquisition. The link acquisition request message 112 includes a device code 118, which may correspond to a genus of similar devices, and a checksum parameter 120. The device code is typically a 16-bit code number that corresponds to a class of controlled devices that respond to similar control data packets. For example, all "FRED" controlled devices may be in a first genus, all "WILMA" controlled devices may be in a second genus, all "DINO" controlled devices may be in a third genus, etc. Although many different types of checksum parameters may be used, the preferred checksum parameter is computed so that the arithmetic sum of all bytes in the data packet, inclusive of the message identification header, the data, and the transmitted checksum parameter, is equal to an integer multiple of 256. This particular checksum parameter is referred to a "modulo 256 checksum parameter."

Each controlled device of a genus corresponding to the device code in the transmitted link acquisition message responds by generating and transmitting a response message 114 back to the controller. The response message 114 includes a device identifier 112, which may be based on a random number generated by a random number generator within the controlled device, and a modulo 256 checksum parameter. The device identifier 112 allows the controller to distinguish among several devices of the same genus that respond to the same link acquisition message. This allows the controller to select one or more of the responding devices within the genus for acquisition. Each controlled device also delays its response message 114 by a delay period 124 that is based on a random number generated by the random number generator within the controlled device. The delay period 124 avoids message collision among the response messages transmitted by several devices of the same genus.

Alternatively, the device identifier 112 may be either by an electronic tag set during manufacturing, such as an electronic serial number, or by user settings. For example, the device identifier 112 could be a personal identification number (PIN) selected by the user and stored in a user-configurable register within the controlled device. The user-selected PIN would then be used as the device identifier 112 for that particular device. Fixed or assignable device identifiers may be useful for certain operations, such as transferring data between controlled devices. In particular, one controlled device could be programmed to recognize another controlled device and to alter its behavior in response to detecting the presence of the other controlled device. For example, the first controlled device could acquire the other controlled device. This would allow the first controlled device to exchange data with the other controlled device, activate or deactivate end effectors within the other controlled device, etc.

The controller receives the response messages and completes the acquisition handshake 110*a* by transmitting a verification message 116. The verification message 116 includes a selected device identifier 126, an assigned subchannel address 128, and a modulo 256 checksum parameter 120. The selected device identifier 126 corresponds to the device identifier 122 received by a particular one of the responding controlled devices that the controller has selected for acquisition. The assigned subchannel address 128 corresponds to a subchannel that the controller and the acquired controlled device use until the controller transmits a link termination message for the assigned subchannel.

The subchannel address 128 is a number, such as a number from 0 to 7 that may be defined by a 3-bit field in a message header, that signifies the intended controlled device for subsequently transmitted control data packets. The use of the subchannels allows the controller to direct control data packets to the acquired controlled device using the 3-bit subchannel address 128 rather than the 16-bit device code. Thus, subchannels reduce the bandwidth required to direct the control data packets to the intended controlled device. In addition, the use of the subchannels allows the controller to distinguish among controlled devices of the same genus. Thus, a particular controlled device of a genus may be selected for acquisition to avoid confusing a child using the system. Alternatively, several controlled devices of a genus may be selected for acquisition on the same subchannel. This might be appropriate for a classroom setting. In addition, different controlled devices of the same genus may be controlled independently on different subchannels, and controlled devices of different genuses may be controlled independently on different subchannels.

Once the controller has acquired the desired controlled devices in the device acquisition segment 102*a*, the data transmission period of the half-duplex communication loop begins. During the data transmission period, the controller may transmit a control data segment 104*a*, in which the controller transmits control data to one or more of the acquired devices. The representative control data segment 104*a* includes a sync symbol 130, a message header 132, control data 134, and a modulo 256 checksum parameter 120. The controller may transmit a number of control data segment directed to different controlled devices until the data transmission period of the half-duplex communication loop is nearly complete.

At the end of the data transmission period, the controller transmits a sync symbol 130, a request for response message 136, and a modulo 256 checksum parameter 120. The data transmission period is followed by the data receipt period of the half-duplex communication loop. During the data receipt period, the controlled device may transmit a sync symbol 130, a message header 132, response data 144, and a modulo 256 checksum parameter 120.

The message header 132 may be an 8-bit word including a 3-bit subchannel address 138 and a 5-bit message type 140. The 3-bit subchannel address 138 allows the protocol to define 8 subchannels, typically numbered 0–7. The 5-bit message type 140 allows the protocol to define up to 32 different message types for each controlled device.

Figure 9:
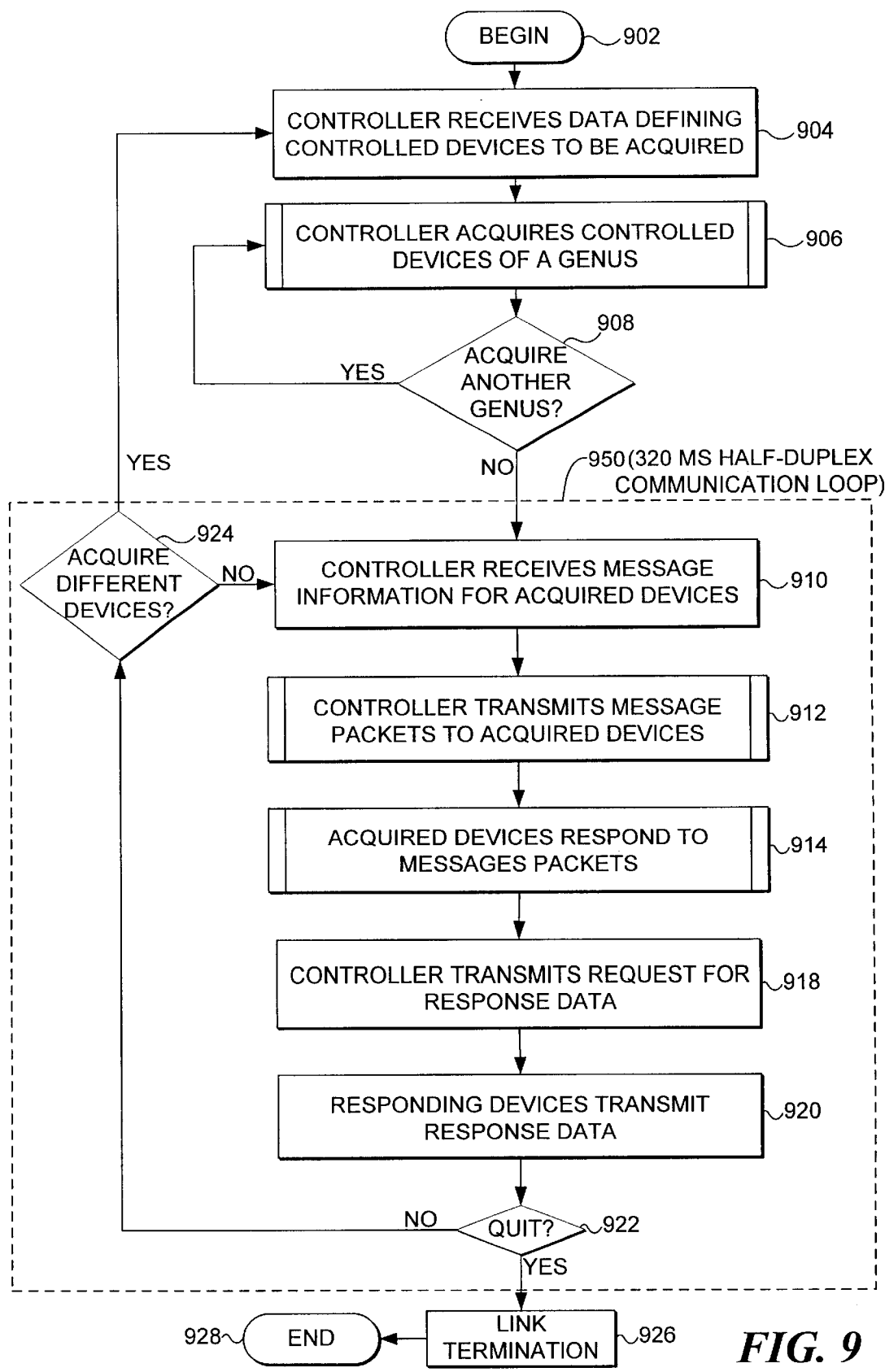
FIG. 9 is a logic flow diagram illustrating a message protocol in a duplex wireless control environment.
Figure 10:
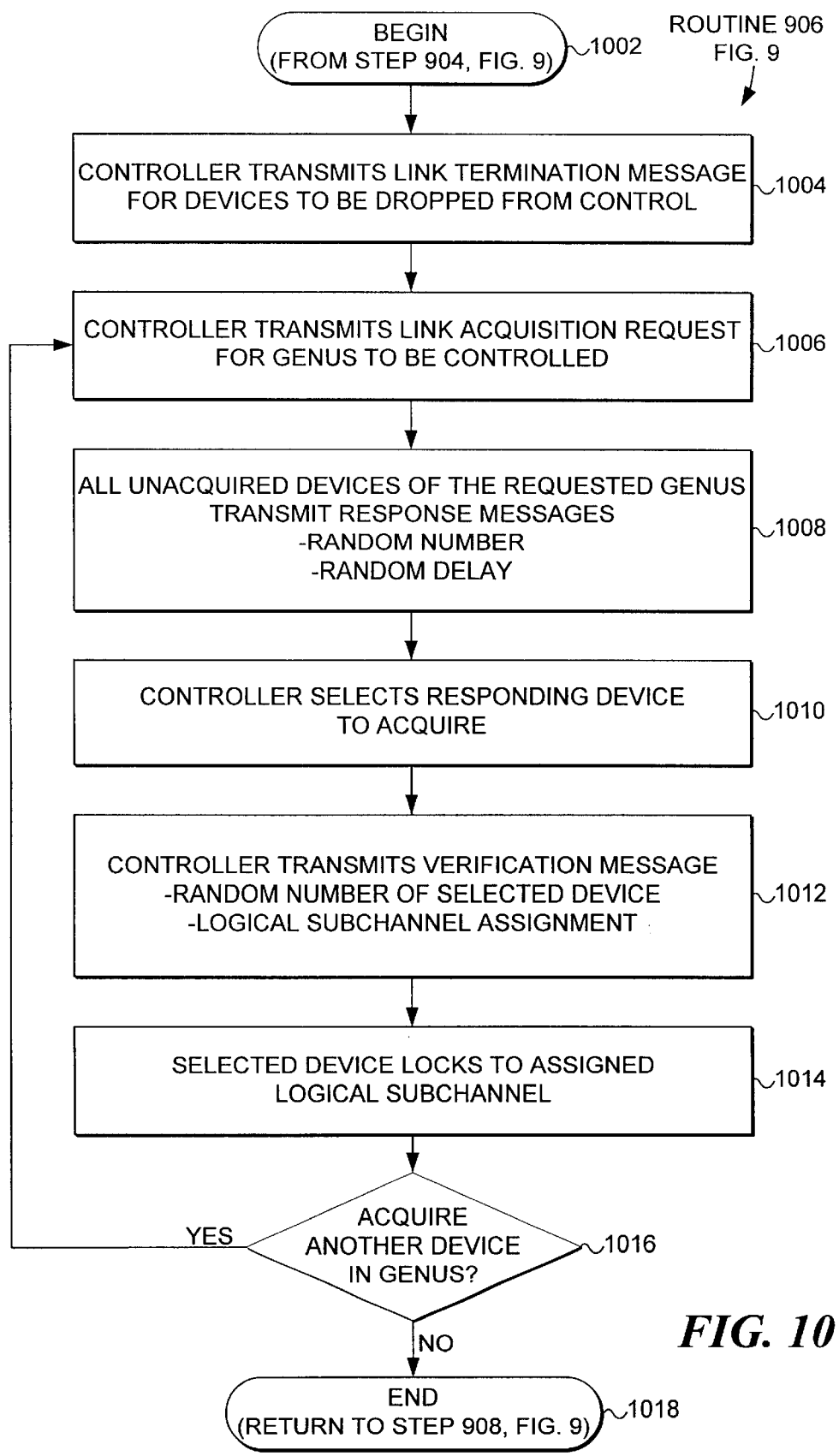
FIG. 10 is a logic flow diagram illustrating a routine in which a controller acquires controlled devices in a duplex wireless control environment.

FIG. 9 is a logic flow diagram illustrating routine 900 for a message protocol in a duplex wireless control environment, such as the environment illustrated in FIG. 2. Routine 900 begins in step 902, and in step 904 the controller receives data defining controlled devices to be acquired. This information may be generated by the computer system 20, or it may be extracted from an Encoded video data stream, as described previously with reference to FIG. 4. In routine 906, the controller acquires one or more controlled devices of a genus. Routine 906, which is described in detail below with respect to FIG. 10, is followed by step 908, in which the controller determines whether to acquire controlled devices of another genus. If the answer to the inquiry of step 908 is yes, the "YES" branch is followed back to routine 906, and the controller acquires one or more controlled devices of another genus. The controller may thus acquire controlled devices until all of the available subchannels have been assigned. Steps 904–908 correspond to the representative device acquisition step 102*a* shown on FIG. 8.

Figure 11:
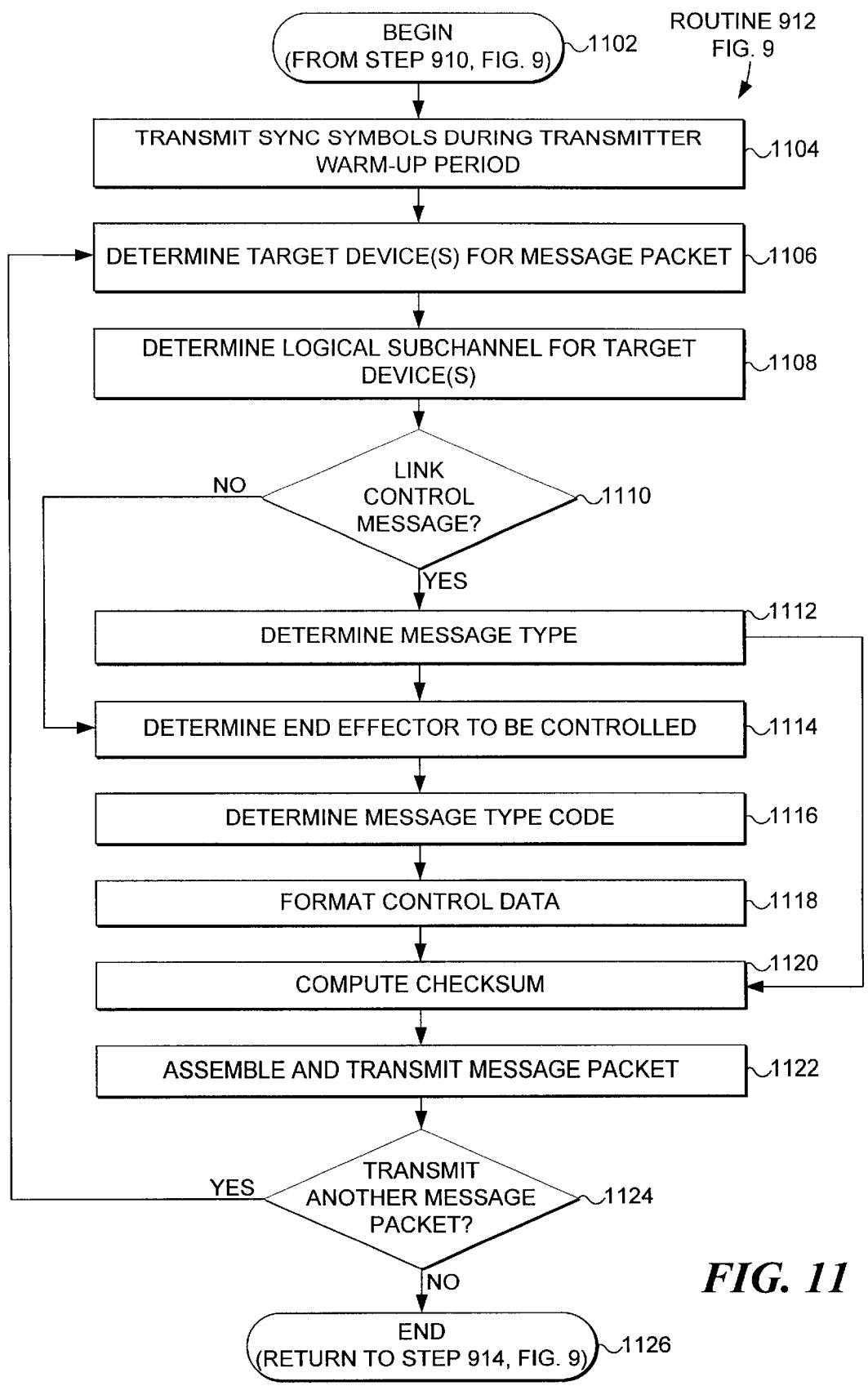
FIG. 11 is a logic flow diagram illustrating a routine in which a controller transmits control data to controlled devices in a duplex wireless control environment.

If the answer to the inquiry of step 908 is no, the "NO" branch is followed from step 908 to step 910, in which the controller receives message information, such as control data, for the acquired devices. Step 910 is followed by routine 912, in which the controller transmits a message packet, such as the control data packet 104*a* shown on FIG. 8, to the acquired devices. Routine 912, which is described in detail below with respect to FIG. 11, is followed by routine 914, in which the acquired devices respond to the message data.

Figure 12:
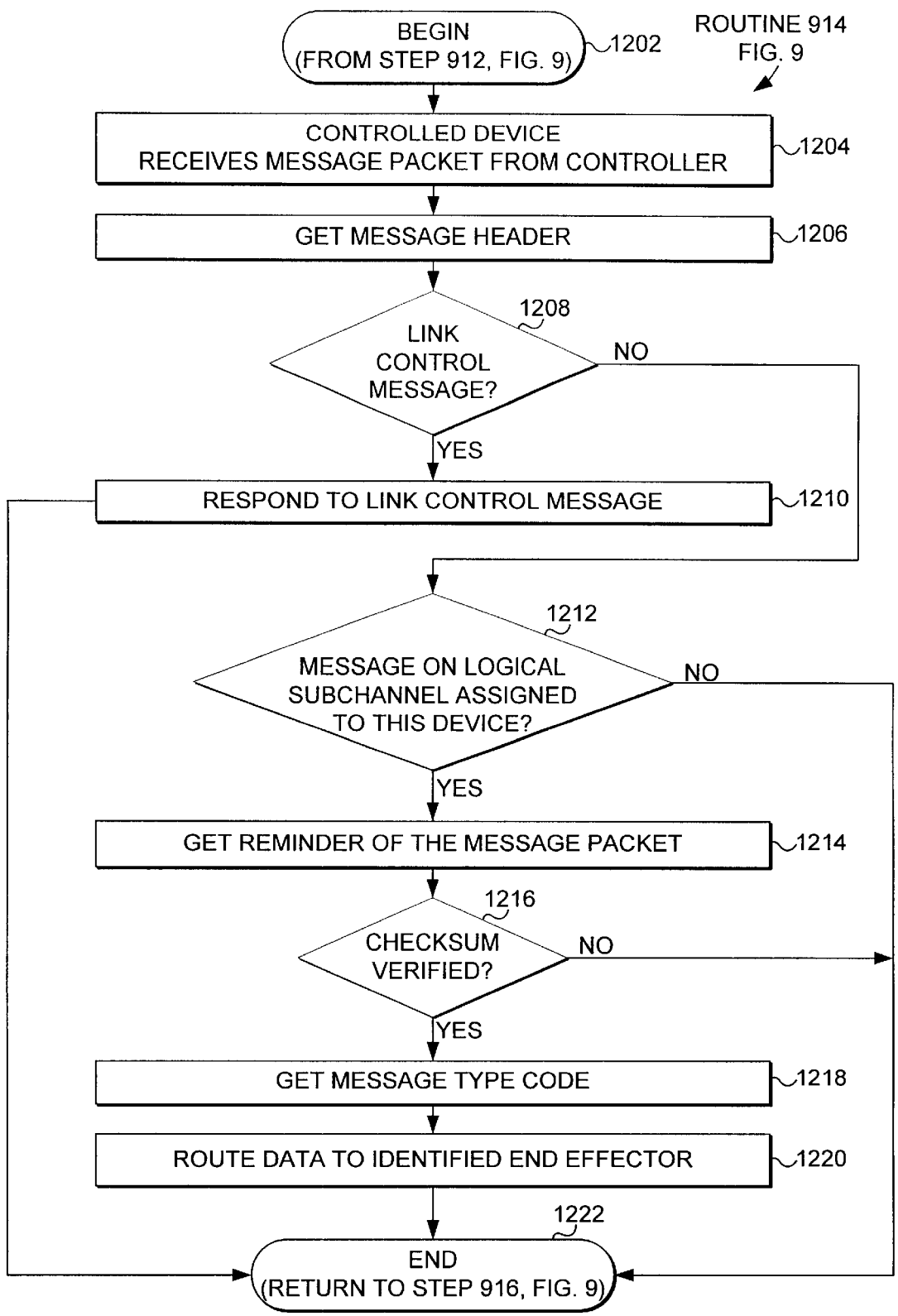
FIG. 12 is a logic flow diagram illustrating a routine in which acquired devices respond to control data in a duplex wireless control environment.

Routine 914, which is described in detail below with respect to FIG. 12, is followed by step 918, in which the controller transmits a request for response message, such as the request for response message 136 shown on FIG. 8, to a selected one of the acquired devices. Step 918 is followed by step 920, in which the selected controlled device transmits a response data packet, such as the response message 106*a* shown on FIG. 8, back to the controller. Multiple acquired devices may be polled for response data provided that the data receipt period of the half-duplex communication loop is long enough to accommodate multiple response messages. In this case, some mechanism for avoiding message collision, such as delay periods based on random numbers generated at the controlled devices, can be employed.

Step 920 is followed by step 922, in which the controller determines whether to quit the wireless communication session. If the answer to the inquiry of step 922 is no, the "NO" branch is followed to step 924, in which the controller determines whether to acquire a different set of controlled devices. If the answer to the inquiry of step 924 is no, the "NO" branch is followed to step 910, in which the controller receives additional message information for the acquired devices. If the answer to the inquiry of step 924 is yes, the "YES" branch is followed to step 904, in which the controller receives data defining controlled devices to be acquired. Referring again to step 922, if the answer to the inquiry of step 922 is yes, the "YES" branch is followed to step 926, in which the controller transmits link termination messages to the acquired devices. Step 926 is followed by the "END" step, and routine 900 is concluded.

Steps 910–922 define a half-duplex communication loop 950 that corresponds to the control and response data segments 104–106 shown in FIG. 8. As noted previously, this half-duplex loop includes a data transmission period followed by a data receipt period. More specifically, steps 910–918 correspond to the data transmission period and step 920 corresponds to the data receipt period of the half-duplex loop 950. Therefore, in routine 914, the controller transmits message packets only so long as there is sufficient time in the data transmission period to transmit another data control packet as well as the request for response message 136, which is transmitted in step 918.

FIG. 10 is a logic flow diagram illustrating routine 906, in which a controller acquires controlled devices in a duplex wireless control environment. Routine 906 begins at step 1002, which follows step 904 shown on FIG. 9. In step 1004, the controller transmits link termination messages to any acquired devices that are to be dropped from control. In step 1006, the controller transmits a link acquisition request, such as the link acquisition request 112 shown on FIG. 8, including a 16-bit device code that corresponds to a genus of devices. In step 1008, each controlled device of the genus corresponding to the device code in the transmitted link acquisition message responds by generating and transmitting a response message, such as the response message 114 shown on FIG. 8, back to the controller.

The response message 114 includes a device identifier, which may be based on a random number generated by a random number generator within the controlled device. Alternatively, the device identifier may be either by an electronic tag set during manufacturing, such as an electronic serial number, or by user settings. The device identifier allows the controller to select one or more of the responding devices for acquisition. Each responding device also preferably delays its response message by a delay period that is based on a random number generated by the random number generator within the controlled device. The delay period avoids message collision among response messages, such as those transmitted by several devices of the same genus.

Step 1008 is followed by step 1010, in which the controller selects a responding device to acquire. In step 1012, the controller transmits a verification message, such as the verification message 116 shown on FIG. 8, to the controlled devices. The verification message includes a selected device identifier and an assigned subchannel address. The selected device identifier corresponds to the device identifier received by a particular one of the responding controlled devices that the controller has selected for acquisition. The assigned subchannel address corresponds to a subchannel that the controller and the acquired device use until the controller transmits a link termination message for the assigned subchannel. As noted previously, the subchannel address is a number, such as a number from 0 to 7 that may be defined by a 3-bit field in a message header, that signifies the intended controlled device for subsequently transmitted message packets. The controller may therefore control up to eight groups of controlled devices simultaneously, one group for each subchannel. The use of the subchannels allows the controller to direct message packets to the acquired controlled device using a 3-bit identifier (i.e., the subchannel address) rather than the 16-bit device code. Thus, subchannels reduce the bandwidth required to direct the message packets to the intended controlled device. In addition, the use of the subchannels allows the controller to distinguish among controlled devices of the same genus.

Step 1012 is followed by step 1014, in which the selected device locks to the assigned subchannel, typically by storing the assigned subchannel address in a predefined memory location. In step 1016, the controller determines whether to acquire another device in the same genus. If the answer to the inquiry of step 1016 is yes, the "YES" branch is followed back to step 1006, in which the controller selects another device of the genus to acquire. Routine 906 thus loops through steps 1006–1016 until all of the desired devices of the genus are acquired or until all of the available subchannels have been assigned. When the answer to the inquiry of step 1016 is no, the "NO" branch is followed to step the "END" step 1018, which returns to step 908 shown on FIG. 9, and Routine 906 is concluded.

FIG. 11 is a logic flow diagram illustrating routine 912, in which the controller transmits message packets to controlled devices in a duplex wireless control environment. Routine 912 begins at step 1102, which follows step 910 shown on FIG. 9. In step 1104, the controller transmits sync symbols during the transmitter warm-up period, typically about 10 ms. In step 1106, the controller determines a target acquired device for a message packet. In step 1108, the controller determines which subchannel is assigned to the target acquired device. If more than one acquired device is assigned to that subchannel, they will all behave in the same manner. In step 1110, the controller determines whether the message is a link control message.

If the message is a link control message, the "YES" branch is followed from step 1110 to step 1112, in which the controller determines which type of link control message to transmit. Referring to FIG. 8, an individual message type 140 in the message header 132 is typically assigned to each type of link control message. Link control messages, which do not precede control data, include the link acquisition request message, the verification response message, and the request for response data message, which are described above with respect to FIG. 8.

Link control messages, which establish or break communication links, include the Link Acquisition Request (LAR), RLM Verification Response (MVR), Link Broadcast Request (LBR), and Link Termination Request (LBR). These messages are not directed by subchannel addressing, but rather are assigned a specific subchannel. For example, subchannel 7 may be reserved for link control messages from the controller to the controlled device, and subchannel 6 may be reserved for response messages from the controlled device back to the controller. Other messages, such as voice data, motion data, test data request, and sensor request messages may be transmitted on the remaining subchannels 0–5. Other types of messages that may be provided in a typically wireless communication protocol include (1) a version request message, in which the controller queries an acquired device to determine the device's version number or other predefined parameters; and (2) a test data request message, in which the controller queries an acquired device to provide test data, such as position information regarding servo motors within the controlled device.

If the message is a not link control message, the "NO" branch is followed from step 1110 to step 1114, in which the controller determines which end effector to control. In step 1116, the controller determines the message type for the end effector to be controlled. In step 1118, the controller determines the format for the control data for the end effector to be controlled. The message type is typically a 5-bit address, which allows the controller to define up to 32 different message types. Although several of the message types may be assigned to link control messages, most are available to control end effectors in each controlled device. A set of message types can be unassigned so that many new end effectors may be included in controlled devices deployed in the future. In addition, the format of the control data for new and existing end effectors may be defined or redefined on a case-by-case basis. This advantageously makes the protocol forwardly compatible with a wide range yet-to-be-developed end effectors and controlled devices.

Steps 1112 (for link control messages) and 1118 (for control data messages) are followed by step 1120, in which the controller computes the modulo 256 checksum parameter for the message packet. The message packet is then transmitted to the controlled device in step 1122. In step 1124, the controller determines whether to transmit another message packet to the acquired devices. In making the decision of step 1124, the controller determines whether there is sufficient time in the data transmission period of the half-duplex communication loop 950 shown on FIG. 9 to transmit another data control packet as well as a request for response message. If the answer to the inquiry of step 1124 is yes, the "YES" branch is followed back to step 1106, in which the controller determines a target acquired device for the next message packet. If the answer to the inquiry of step 1124 is no, the "NO" branch is followed to the "END" step 1106, which returns to step 914 shown on FIG. 9, and routine 912 is concluded.

FIG. 12 is a logic flow diagram illustrating routine 914, in which acquired devices respond to message packets in a duplex wireless control environment. Routine 914 begins at step 1202, which follows step 912 shown on FIG. 9. In step 1204, the controlled device receives a message packet from the controller. In step 1206, the controlled device gets the message header from the transmitted message packet. In step 1208, the controlled device determines from the message type whether the received message packet is a link control message. If the message is a link control message, the "YES" branch is followed to step 1210, in which the controlled device responds to the link control message. Step 1210 is followed by the "END" step 1222, which returns to step 916 shown on FIG. 9, and routine 914 is concluded.

Referring again to step 1208, if the message is a not link control message, the "NO" branch is followed to step 1212, in which the controlled device compares the transmitted subchannel address to the device's assigned subchannel address, which the device locked to in step 1014 shown on FIG. 10, to determine whether the message packet was transmitted on the subchannel address assigned to the device. If the answer to the inquiry of step 1212 is no, the "NO" branch is followed to the "END" step 1222, which returns to step 916 shown on FIG. 9, and routine 914 is concluded. In other words, the controlled device ignores all message packets that are not on the subchannel assigned to the controlled device.

If the answer to the inquiry of step 1212 is yes, the "YES" branch is followed to step 1214, in which the controller gets the remainder of the message packet. In step 1216, the controlled device determines whether the checksum is verified. That is, the controlled device determines whether the arithmetic sum of all bytes in the data packet, inclusive of the message identification header, the data, and the transmitted checksum parameter, is equal to an integer multiple of 256. If the checksum is not verified, the "NO" branch is followed to the "END" step 1220, which returns to step 916 shown on FIG. 9, and routine 914 is concluded. The controlled device thus ignores all message packets that do not include verified checksums.

If the checksum is verified in step 1216, the "YES" branch is followed to step 1218, in which the controlled device gets the message type from the message header of the message packet. Step 1218 is followed by step 1220, in which the controlled device responds to the control data, typically by routing the control data to an end effector identified by the message type. For example, motor movement coefficients are routed to one or more of the motion servo motors 69, voice synthesis coefficients are routed to the elastic queue data buffer 62 where they are temporarily stored until they are fed to the speech synthesizer 61, etc. Step 1220 is followed by the "END" step 1220, which returns to step 916 shown on FIG. 9, and routine 914 is concluded.

Figure 13:
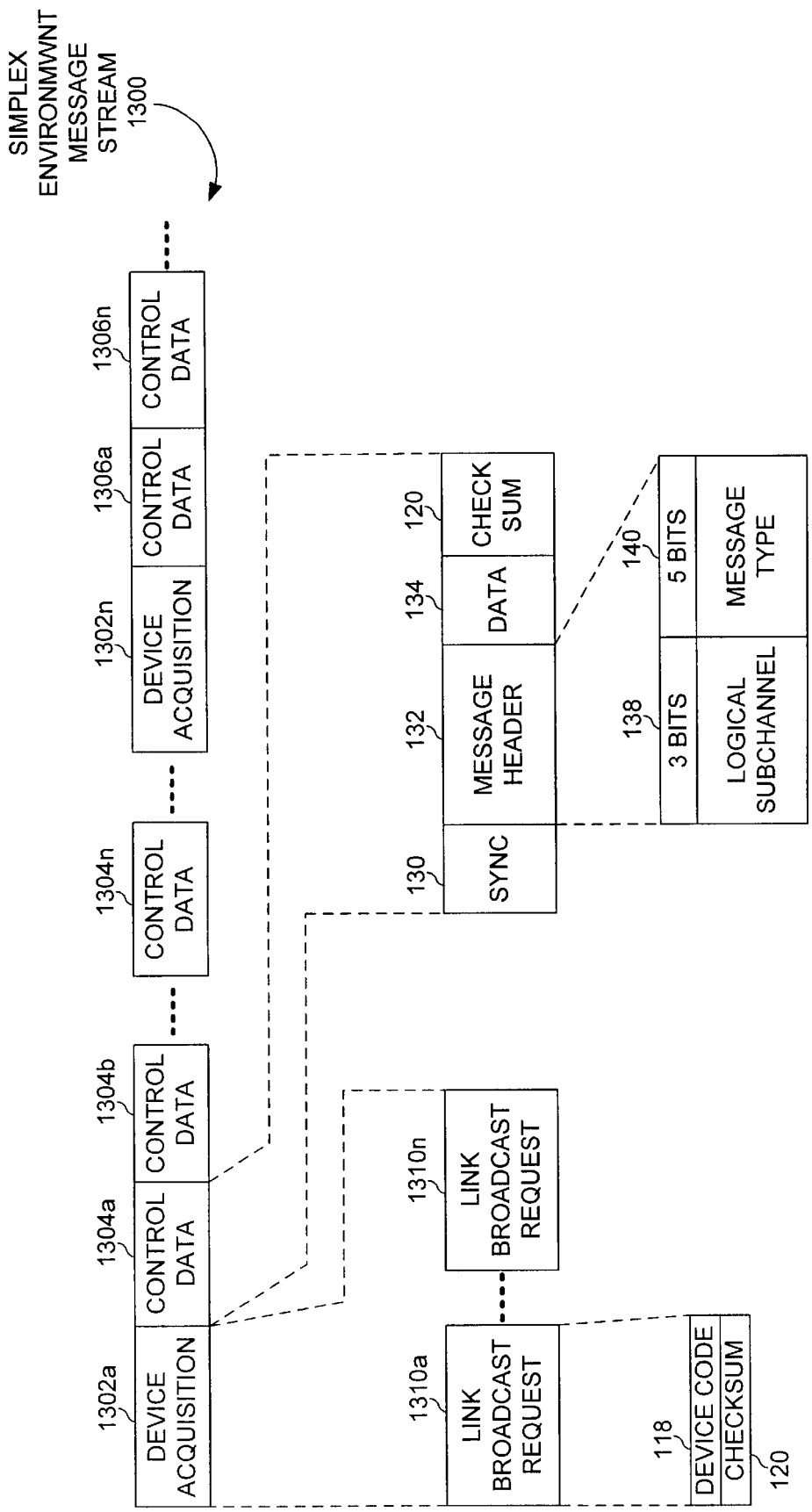
FIG. 13 is a logic flow diagram illustrating a message protocol in a simplex wireless control environment.

FIG. 13 is a logic flow diagram illustrating a message protocol in a simplex wireless control environment, such as the environment illustrated in FIG. 4. The simplex wireless control environment includes a controller, such as the wireless modulator 90, and a controlled device, such as the controlled device 60. The message stream 1300 is specifically adapted for controlling a controlled device, such as a dinosaur "BARNEY" toy, in a learning and entertainment system for a child. Those skilled in the art will understand that the specific messages and message components described below define this exemplary embodiment of the invention, and that other message formats and message components may be defined to perform the similar functions for other controlled devices.

The message stream 1300 includes a device acquisition segment 1302*a*, in which the controller acquires one or more controlled devices, followed by one or more control data segment 1204*a–n*, in which the controller transmits control data to one or more controlled devices. The controller may later acquire another set of devices in the acquisition segment 1302*n*, which is followed by one or more control data segments 1306*a–n*. The controller may therefore control a plurality of devices, represented by the controlled device 60, so that they behave as characters in scenes of an audio/visual presentation displayed on the display device 47, as described previously.

The representative device acquisition segment 1302*a* includes one or more device link broadcast requests 1310*a–n*. The representative link broadcast requests 1310*a* includes a device code 118 and a checksum parameter 120, which are described above with reference to FIG. 8. The representative control data segment 1304*a* includes a sync symbol 130, a message header 132, control data 134, and a modulo 256 checksum parameter 120, which are also described above with reference to FIG. 8. The message header 132 may be an 8-bit word including a 3-bit subchannel address 138 and a 5-bit message type 140. The 3-bit subchannel address 138 allows the protocol to define 8 subchannels, typically numbered 0–7. The 5-bit message type 140 allows the protocol to define up to 32 different message types for each controlled device. Thus, the message stream 1300 is a simplified version of the message stream 100 described with reference to FIG. 8 that may be employed in a simplex environment.

Figure 14:
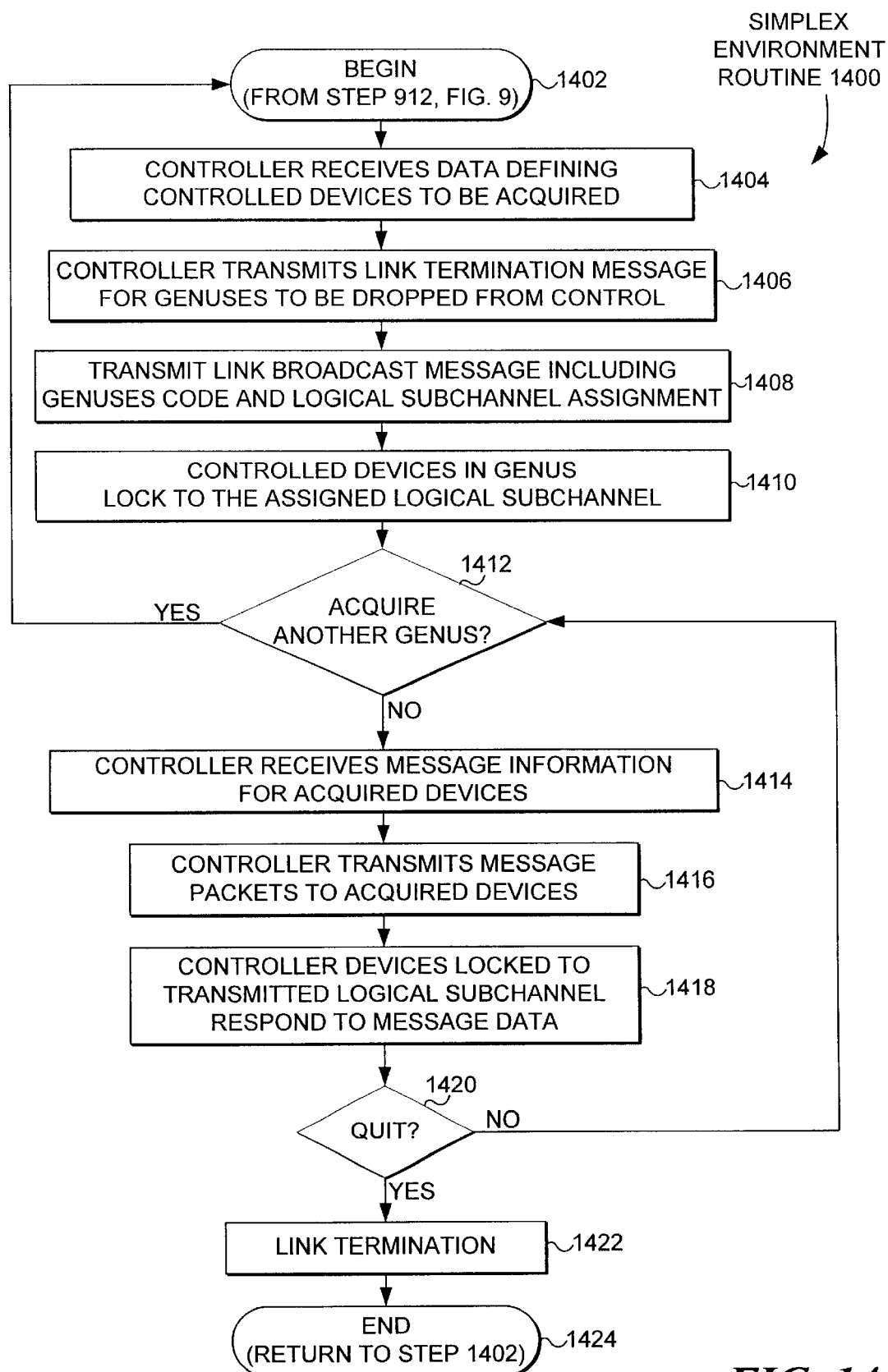
FIG. 14 is a logic flow diagram illustrating a routine in which a controller acquires and operates controlled devices in a simplex wireless control environment.

FIG. 14 is a logic flow diagram illustrating routine 1400 for a message protocol in a simplex wireless control environment, such as the environment illustrated in FIG. 4. Routine 1400 begins in step 1402, and in step 1404 the controller receives data defining controlled devices to be acquired. This information may be generated by a computer system, or it may be extracted from an Encoded video data stream, as described previously with reference to FIG. 4. In step 1406, the controller transmits link termination messages to any acquired devices that are to be dropped from control. In step 1408, the controller transmits a link broadcast request including a device code and a subchannel address to acquire one or more controlled devices, such as a genus of devices.

In step 1410, the controlled devices corresponding to the device code lock to the assigned subchannel. In step 1412, the controller determines whether to acquire controlled devices of another genus. If the answer to the inquiry of step 1412 is yes, the "YES" branch is followed back to step 1404, and the controller acquires one or more controlled devices of another genus. The controller may thus acquire controlled devices until all of the available subchannels have been assigned. Steps 1404–1412 correspond to the representative device acquisition step 1302a shown on FIG. 13.

If the answer to the inquiry of step 1412 is no, the "NO" branch is followed from step 1412 to step 1414, in which the controller receives message information, such as control data, for the acquired devices. Step 1414 is followed by routine 1416, in which the controller transmits a message packet, such as the control data packet 1304a shown on FIG. 13, to the acquired devices. In step 1418, the acquired devices that are locked to the transmitted subchannel respond to the message data.

In step 1420, the controller determines whether to quit the wireless communication session. If the answer to the inquiry of step 1420 is no, the "NO" branch is followed to step 1412, in which the controller determines whether to acquire a different set of controlled devices. If the answer to the inquiry of step 1420 is yes, the "YES" branch is followed to step 1422, in which the controller transmits link termination messages to the acquired devices. Step 1422 is followed by the "END" step 1424, which preferably returns to step 1402, and routine 1400 is concluded.

The specific message protocol for an exemplary embodiment of the present invention is defined by the following tables 1–17. Those skilled in the art will understand that this particular message protocol illustrates only one of many specific message protocols that may be defined in accordance with the present invention.

TABLE 1

RLM Link Control Messages

| Data | B7 | B6 | B5 | B4 | B3 | B2 | B1 | B0 | hex | Definition |
|---|---|---|---|---|---|---|---|---|---|---|
| 2 | 1 | 1 | 1 | 0 | 0 | 0 | 0 | 0 | E0 | Link Acquisition Request (LAR) |
| 2 | 1 | 1 | 1 | 0 | 0 | 0 | 0 | 1 | E1 | RLM Verification Response (MVR) |
| 3 | 1 | 1 | 1 | 0 | 0 | 0 | 1 | 0 | E2 | Link Broadcast Request (LBR) |
| 1 | 1 | 1 | 1 | 0 | 0 | 0 | 1 | 1 | E3 | Link Termination Request (LTR) |

TABLE 2

Link Acquisition Request Data Set

| Offset | Data Size | Definition |
|---|---|---|
| +0 | 16 bit | Requested Genus Definition: This value specifies the target Genus to which this link request is directed (LSByte first). |
| 2 bytes | | Total LAR data set size |

TABLE 3

Link Broadcast Request Data Set

| Offset | Data Size | Definition |
|---|---|---|
| +0 | 16 bit | Requested Genus Definition: This value specifies the target Genus to which this broadcast request is directed (LSByte first). |
| +2 | 3 bit | Subchannel Assignment This is the subchannel assigned for this link acquisition sequence (0 through 5 are valid values). |
| 2 bytes | | Total LAR data set size |

TABLE 4

Link Termination Request Data Set

| Offset | Data Size | Definition |
|---|---|---|
| +0 | 3 bit | Subchannel This is the subchannel who's link is to be terminated (0 through 5 are valid values). |
| 1 bytes | | Total LTR data set size |

TABLE 5

RLM Verification Response Data Set

| Offset | Data Size | Definition |
|---|---|---|
| +0 | 8 bit | Device ID This is a randomly-generated non-zero value supplied by the RP, used to identify that RP (Note: random number must be in the range 1->255) |

TABLE 5-continued

RLM Verification Response Data Set

| Offset | Data Size | Definition |
|---|---|---|
| +1 | 3 bit | Subchannel Assignment This is the subchannel the RP should listen to (0 through 5 are valid subchannel values). |
| 2 bytes | | Total MVR data set size |

TABLE 6

RLM Data Transfer Messages

| Data | B7 | B6 | B5 | B4 | B3 | B2 | B1 | B0 | Definition |
|---|---|---|---|---|---|---|---|---|---|
| 0 | c | c | c | 0 | 0 | 0 | 0 | 0 | Telemetric Response Request/Ack (TRQA) |
| 0 | c | c | c | 0 | 0 | 0 | 0 | 1 | Telemetric Response Request/Nack (TRQN) |
| 0 | c | c | c | 0 | 0 | 0 | 1 | 0 | Version Request (VREQ) |
| 1 | c | c | c | 0 | 0 | 0 | 1 | 1 | Directed Motion Control Data (MCD) |
| 0 | c | c | c | 0 | 0 | 1 | 0 | 0 | Compressed Packetized Voice Data (PVDO) |
| 5 | c | c | c | 0 | 0 | 1 | 0 | 1 | Compressed Packetized Voice Data (PVD5) |
| 7 | c | c | c | 0 | 0 | 1 | 1 | 0 | Compressed Packetized Voice Data (PVD7) |
| 0 | c | c | c | 0 | 0 | 1 | 1 | 1 | Test Data Request (TSTREQ) |

TABLE 7

Compressed Packetized Voice, Data Set

| Offset | B7 | B6 | B5 | B4 | B3 | B2 | B1 | B0 | Value |
|---|---|---|---|---|---|---|---|---|---|
| +0 | $P_z$ | $P_z$ | $P_z$ | $R_z$ | $E_z$ | $E_z$ | $E_z$ | $E_z$ | LPC Data |
| +1 | $K^x_y$ | $K^x_y$ | $K^x_y$ | $K^x_y$ | $P_z$ | $P_z$ | $P_z$ | $P_z$ | |
| +2 | $K^x_y$ | $K^x_y$ | $K^x_y$ | $K^x_y$ | $K^x_y$ | $K^x_y$ | $K^x_y$ | $K^x_y$ | |
| +3 | $K^x_y$ | $K^x_y$ | $K^x_y$ | $K^x_y$ | $K^x_y$ | $K^x_y$ | $K^x_y$ | $K^x_y$ | |
| +4 | $K^x_y$ | $K^x_y$ | $K^x_y$ | $K^x_y$ | $K^x_y$ | $K^x_y$ | $K^x_y$ | $K^x_y$ | |
| +5 | $K^x_y$ | $K^x_y$ | $K^x_y$ | $K^x_y$ | $K^x_y$ | $K^x_y$ | $K^x_y$ | $K^x_y$ | (present for PVD7 only) |
| +6 | 0 | $K^x_y$ | $K^x_y$ | $K^x_y$ | $K^x_y$ | KXy | $K^x_y$ | $K^x_y$ | (present for PVD7 only) |
| 7 bytes | | | | | | | | | Total data set size |

TABLE 8

Directed Motion Control, Data Set

| Offset | B7 | B6 | B5 | B4 | B3 | B2 | B1 | B0 | Value |
|---|---|---|---|---|---|---|---|---|---|
| +0 | 0 | 0 | $S_1$ | $S_0$ | 0 | $P_2$ | $P_1$ | $P_0$ | Movement index (SS) and value (PPP). |
| 1 byte | | | | | | | | | Total data set size |

TABLE 9

Physical Representation of Movements in RP V1.0

| Movement Index (S S) | Min Value (P P P) | Max Value (P P P) | Physical Representation |
|---|---|---|---|
| 0 | 0 = Closed | — | Mouth - reserved |
| 1 | 1 = right | 7 = left | Head Tilt (4 center, O not used) |
| 2 | 0 = front | 7 = back | Left Arm Rotate |
| 3 | 0 = front | 7 = back | Right Arm Rotate |

TABLE 10

RP Response Messages

| Data | B7 | B6 | B5 | B4 | B3 | B2 | B1 | B0 | hex | Definition |
|---|---|---|---|---|---|---|---|---|---|---|
| 1 | 1 | 1 | 0 | 0 | 0 | 0 | 0 | 0 | C0 | RP Verification Response (PVR) |
| 2 | 1 | 1 | 0 | 0 | 0 | 0 | 0 | 1 | C1 | Telemetric Response (TDR) |
| 3 | 1 | 1 | 0 | 0 | 0 | 0 | 1 | 0 | C2 | Version Request Response (VREQR) |
| 4 | 1 | 1 | 0 | 0 | 0 | 0 | 1 | 1 | C3 | Test Data Request Response (TSTREQR) |

TABLE 11

RP Verification Response Message Data Set

| Offset | Data Size | Definition |
|---|---|---|
| +0 | 8 bit | Device ID<br>This is a randomly-generated non-zero value supplied by the RP, used to identify that RP. |
| 1 bytes | | Total data set size |

TABLE 12

Telemetric Response, Data Set

| Offset | B7 | B6 | B5 | B4 | B3 | B2 | B1 | B0 | Value |
|---|---|---|---|---|---|---|---|---|---|
| +0 | — | — | — | — | — | — | — | S0 | Left Hand Sensor Status |
|  | — | — | — | — | — | — | S1 | — | Right Hand Sensor Status |
|  | — | — | — | — | — | S2 | — | — | Left Foot Sensor Status |
|  | — | — | — | — | S3 | — | — | — | Right Foot Sensor Status |
|  | — | — | — | H | — | — | — | — | RP is Horizontal |
|  | — | — | L | — | — | — | — | — | Light Sensor |
|  | X | X | — | — | — | — | — | — | Reserved |
| +1 | — | — | — | — | — | — | — | $\Delta S_0$ | Delta Left Hand Sensor |
|  | — | — | — | — | — | — | $\Delta S_1$ | — | Delta Right Hand Sensor |
|  | — | — | — | — | — | $\Delta S_2$ | — | — | Delta Left Foot Sensor |
|  | — | — | — | — | $\Delta S_3$ | — | — | — | Delta Right Foot Sensor |
|  | — | — | — | $\Delta H$ | — | — | — | — | Delta Horizontal Sensor |
|  | — | — | $\Delta L$ | — | — | — | — | — | Delta Light Sensor |
|  | X | X | — | — | — | — | — | — | Reserved |
| 2 bytes | | | | | | | | | Total data set size |

TABLE 13

RP Version Request Response Message Data Set

| Offset | Data Size | Definition |
|---|---|---|
| +0 | 8 bit | PIC Version number<br>A byte version number for the PIC microprocessor |
| +1 | 8 bit | ROM Version number<br>A byte version number for the speech ROM |
| +2 | 8 bit | TSP Version number<br>A byte version number for the TSP microprocessor |
| 3 bytes | | Total data set size |

;l
TABLE 14

RP Test Data Request Response Message Data Set

| Offset | B7 | B6 | B5 | B4 | B3 | B2 | B1 | B0 | Value |
|---|---|---|---|---|---|---|---|---|---|
| +0 | — | — | — | — | P03 | P02 | P01 | P00 | Position of 0th servo (reserved) |
|  | $P^1_3$ | $P^1_2$ | $P^1_1$ | $P^1_0$ | — | — | — | — | Position of 1st servo (head tilt) |
| +1 | — | — | — | — | $P^2_3$ | $P^2_2$ | $P^2_1$ | $P^2_0$ | Position of 2nd servo) left arm) |
|  | $P^3_3$ | $P^3_2$ | $P^3_1$ | $P^3_0$ | — | — | — | — | Position of 3rd servo (right arm) |
| +2 | E | E | E | E | E | E | E | E | Communication Error Count |

TABLE 14-continued

RP Test Data Request Response Message Data Set

| Offset | B7 | B6 | B5 | B4 | B3 | B2 | B1 | B0 | Value |
|---|---|---|---|---|---|---|---|---|---|
| +3 4 bytes | T | T | T | T | T | T | T | T | TRQ seen count Total data set size |

TABLE 15

Directed Link Acquisition

| Code | Size | RLM | RP | Comments |
|---|---|---|---|---|
| H'E0 | 1 | Link Acquisition Request | | (LAR) |
| | 2 | Requested Genus. | | |
| | 1 | checksum | RP Verification Response | |
| H'C0 | 1 | | Link Code Phrase | (PVR) |
| | 1 | | checksum | This is a 8-bit random number |
| | 1 | | | |
| H'E1 | 1 | RLM Verification Response | | (MVR) |
| | 1 | Link Code Phrase | | The 8-bit random number from the RP |
| | 1 | Subchannel Assignment | | Subchannel assigned to the answering RP (0->5) |
| | 1 | checksum | | |

TABLE 16

Broadcast Link Acquisition

| Code | Size | RLM | RP | Comments |
|---|---|---|---|---|
| H'E2 | 1 | Link Broadcast Request | | (LBR) |
| | 2 | Requested Genus. | | |
| | 1 | Subchannel Assignment | | Subchannel assigned all RPs (0->5) |
| | 1 | checksum | | |

TABLE 17

Data Transfer

| Code | Size | RLM | RP | Comments |
|---|---|---|---|---|
| B'ccc0010 | 1 | Compressed Packetized Voice Data | | (PVD) |
| | 7 | LPC data | | |
| | 1 | checksum | | |
| B'ccc0001 | 1 | Telemetric Response Request/Ack | | (TRQA) no data |
| | 1 | checksum | | |
| H'C1 | 1 | | Telemetric Data Response | (TDR) |
| | 2 | | Sensor data sent back from the RP to the RLM after a Telemetric Response Request | |
| | 1 | checksum | | |

The invention thus provides a wireless communication protocol that enables unidirectional communications in a simplex environment, or bidirectional communications in a duplex environment, between a controller and one or more controlled devices. The controller receives or generates video data and control data that may include voice synthesis coefficients and motor movement coefficients for the controlled devices. The video data drives a display device to depict a scene, and the control data drives the controlled device(s) so that the controlled device(s) behave as characters in the scene depicted on the display device. Each controlled device is operable for recognizing messages directed to the device and for parsing these messages into control signals for a number of end effectors, such as speech synthesizers, servo motors, etc. The content of messages for, and the set of end effectors in, any particular controlled device may be changed so that the system is forwardly compatible for new controlled devices using the protocol.

It should be understood that the foregoing relates only to specific embodiments of the invention, and that numerous changes may be made therein without departing from the spirit and scope of the invention as defined by the following claims.

What is claimed is:

1. A method for communicating data between a controller and a controlled device having an assigned device code, comprising the steps of:

transmitting an acquisition message from the controller to the controlled device including a transmitted device code and a subchannel address;

at the controlled device, comparing the assigned device code to the transmitted device code;

if the assigned device code corresponds to the transmitted device code, storing the subchannel address at the controlled device as an assigned subchannel address;

transmitting a control data packet from the controller to the controlled device including a message header and control data, the message header including a message subchannel address;

at the controlled device, comparing the assigned subchannel address to the message subchannel address; and if the assigned subchannel address corresponds to the message subchannel address, responding to the control data at the controlled device.

2. The method of claim 1, wherein the subchannel address consists of fewer data bits than the assigned device code.

3. The method of claim 2, wherein the subchannel address consists essentially of three data bits and the assigned device code comprises at least sixteen data bits.

4. The method of claim 1, further comprising the steps of:

extracting the control data from a data stream comprising video data and encoded control data;

driving a display device with the video data to depict a scene; and modulating a radio-frequency carrier in response to the extracted control data to create the control data packet.

5. The method of claim 4, further comprising the step of:

synchronizing the control data with the video data so that the controlled device behaves as a character in the scene depicted on the display device.

6. The method of claim 4, wherein:

the data stream comprises a video signal comprising a plurality of horizontal scan lines, each scan line comprising a horizontal overscan interval; and the control data is encoded in the horizontal overscan intervals.

7. The method of claim 6, wherein the data stream is recovered from a storage media.

8. The method of claim 7, wherein the storage media comprises:

a magnetic tape, an analog laser disk, or a digital laser disk.

9. The method of claim 6, wherein the data stream is received on a broadcast receiver.

10. The method of claim 9, wherein the broadcast receiver comprises:

an aerial antenna, a satellite signal receiver, a direct broadcast satellite signal receiver, or a cable television tuner.

11. A method for communicating data between a controller and a plurality of controlled devices including a first controlled device having a first assigned device code and a second controlled device having a second assigned device code, comprising the steps of:

transmitting a first acquisition message from the controller to the controlled devices including a first transmitted device code and a first subchannel address;

at the first controlled device, comparing the first assigned device code to the first transmitted device code;

if the first assigned device code corresponds to the first transmitted device code, storing the first subchannel address at the first controlled device as a first assigned subchannel address;

transmitting a first control data packet from the controller to the first controlled device including a first message header and first control data, the message header including a first message subchannel address;

at the first controlled device, comparing the first assigned subchannel address to the first message subchannel address;

if the first assigned subchannel address corresponds to the first message subchannel address, responding to the first control data at the first controlled device;

transmitting a second acquisition message from the controller to the controlled devices including a second transmitted device code and a second subchannel address;

at the second controlled device, comparing the second assigned device code to the second transmitted device code;

if the second assigned device code corresponds to the second transmitted device code, storing the second subchannel address at the second controlled device as a second assigned subchannel address;

transmitting a second control data packet from the controller to the second controlled device including a second message header and second control data, the message header including a second message subchannel address;

at the second controlled device, comparing the second assigned subchannel address to the second message subchannel address; and if the second assigned subchannel address corresponds to the second message subchannel address, responding to the second control data at the second controlled device.

12. The method of claim 11, further comprising the steps of:

extracting the first and second control data from a data stream comprising video data and encoded control data;

driving a display device with the video data to depict a scene; and modulating a radio-frequency carrier with the extracted control data.

13. The method of claim 12, further comprising the step of:

synchronizing the first and second control data with the video data so that the first and second controlled devices behave as characters in the scene depicted on the display device.

14. The method of claim 12, wherein:

the data stream comprises a video signal comprising a plurality of horizontal scan lines, each scan line comprising a horizontal overscan interval; and the control data is encoded in the horizontal overscan intervals.

15. The method of claim 14, wherein the data stream is recovered from a storage media.

16. The method of claim 15, wherein the storage media comprises:

a magnetic tape, an analog laser disk, or a digital laser disk.

17. The method of claim 14, wherein the data stream is received on a broadcast receiver.

18. The method of claim 17, wherein the broadcast receiver comprises:
an aerial antenna, a satellite signal receiver, a direct broadcast satellite signal receiver, or a cable television tuner.

19. A method for communicating data between a controller and a controlled device having an assigned device code, comprising the steps of:
transmitting an acquisition message from the controller to the controlled device including a transmitted device code;
at the controlled device, comparing the assigned device code to the transmitted device code;
if the assigned device code corresponds to the transmitted device code, transmitting a response message, including a device identifier, from the controlled device to the controller;
transmitting a verification message, including a transmitted identifier and a subchannel address, from the controller to the controlled device;
at the controlled device, comparing the device identifier to the transmitted identifier; and
if the device identifier corresponds to the transmitted identifier, storing the subchannel address at the controlled device as an assigned subchannel address.

20. The method of claim 19, further comprising the steps of:
transmitting a control data packet, including a message header and control data, from the controller to the controlled device, the message header including a message subchannel address;
at the controlled device, comparing the assigned subchannel address to the message subchannel address; and
if the assigned subchannel address corresponds to the message subchannel address, responding to the control data at the controlled device.

21. The method of claim 20, further comprising the steps of:
extracting the control data from a data stream comprising video data and encoded control data;
driving a display device with the video data to depict a scene;
modulating a radio-frequency carrier with the extracted control data; and
synchronizing the control data with the video data so that the controlled device behaves as a character in the scene depicted on the display device.

22. The method of claim 19, wherein the device identifier is based on a random number generated by the controlled device.

23. The method of claim 22, further comprising the steps of:
computing a delay period based on another random number; and
delaying the response message by the delay period.

24. The method of claim 19, wherein the device identifier is an electronic serial number assigned by the manufacturer.

25. The method of claim 19, wherein the device identifier is stored within a user-configurable register within the controlled device.

26. The method of claim 21, wherein:
the data stream comprises a video signal comprising a plurality of horizontal scan lines, each scan line comprising a horizontal overscan interval; and
the control data is encoded in the horizontal overscan intervals.

27. The method of claim 26, wherein the data stream is recovered from a storage media.

28. The method of claim 27, wherein the storage media comprises:
a magnetic tape, an analog laser disk, or a digital laser disk.

29. The method of claim 26, wherein the data stream is received on a broadcast receiver.

30. The method of claim 29, wherein the broadcast receiver comprises:
an aerial antenna, a satellite signal receiver, a direct broadcast satellite signal receiver, or a cable television tuner.

31. A method for communicating data between a controller and a plurality of controlled devices including a first controlled device having a first assigned device code and a second controlled device having a second assigned device code, comprising the steps of:
transmitting a first acquisition message from the controller to the controlled devices including a first transmitted device code;
at the first controlled device, comparing the first assigned device code to the first transmitted device code;
if the first assigned device code corresponds to the first transmitted device code, transmitting a first response message, including a first device identifier, from the first controlled device to the controller;
transmitting a first verification message from the controller to the controlled devices including the first transmitted identifier and a first subchannel address;
at the first controlled device, comparing the first device identifier to the first transmitted identifier;
if the first device identifier corresponds to the first transmitted identifier, storing the first subchannel address at the first controlled device as a first assigned subchannel address;
transmitting a second acquisition message from the controller to the controlled devices including a second transmitted device code;
at the second controlled device, comparing the second assigned device code to the second transmitted device code;
if the second assigned device code corresponds to the second transmitted device code, transmitting a second response message, including a second device identifier, from the second controlled device to the controller;
transmitting a second verification message, including the second device identifier and a second subchannel address, from the controller to the second controlled device; at the second controlled device, comparing the second device identifier to the second transmitted identifier; and
if the second device identifier corresponds to the second transmitted identifier, storing the second subchannel address at the second controlled device as a second assigned subchannel address.

32. The method of claim 31, further comprising the steps of:
transmitting a first control data packet, including a first message header and first control data, from the controller to the first controlled device, the first message header including a first message subchannel address;
at the first controlled device, comparing the first assigned subchannel address to the first message subchannel address;

if the first assigned subchannel address corresponds to the first message subchannel address, responding to the first control data at the first controlled device;

transmitting a second control data packet, including a second message header and second control data, from the controller to the second controlled device, the second message header including a second message subchannel address;

at the second controlled device, comparing the second assigned subchannel address to the second message subchannel address; and if the second assigned subchannel address corresponds to the second message subchannel address, responding to the second control data at the second controlled device.

33. The method of claim 32, further comprising the steps of:

extracting the first and second control data from a data stream comprising video data and encoded control data;

driving a display device with the video data to depict a scene;

modulating a radio-frequency carrier with the extracted control data; and synchronizing the first and second control data with the video data so that the first and second controlled devices behave as characters in the scene depicted on the display device.

34. The method of claim 31, wherein:

the first device identifier is based on a first random number generated by the first controlled device; and the second device identifier is based on a second random number generated by the second controlled device.

35. The method of claim 34, further comprising the steps of:

computing a first delay period at the first controlled device;

delaying the first response message by the first delay period;

computing a second delay period at the second controlled device; and delaying the second response message by the second delay period.

36. A method for communicating data between a controller and a controlled device including a plurality of end effectors, each end effector having an end effector address, comprising the steps of:

transmitting a first control data packet, including a first message header and first control data from the controller to the controlled device, the first message header including a first end effector address;

at the controlled device, responding to the first end effector address by routing the first control data to the first end effector;

transmitting second a control data packet, including a second message header and second control data from the controller to the controlled device, the second message header including a second end effector address; and at the controlled device, responding to the second end effector address by routing the second control data to the second end effector.

37. The method of claim 36, wherein the first control data comprises voice synthesis coefficients, further comprising the step of:

at the first end effector, synthesizing voice sounds based on the voice synthesis coefficients.

38. The method of claim 37, wherein the second control data comprises motor movement data, further comprising the step of:

at the second end effector, operating a motor based on the motor movement data.

39. A controller for controlling a controlled device of a wireless control system comprising:

a processor for receiving a data stream comprising video data, encoded acquisition data, and encoded control data;

a display device for displaying the video data to depict a scene;

a protocol handler coupled to the processor;

the processor being operable for extracting the encoded acquisition data from the data stream and routing the encoded acquisition data to the protocol handler;

the protocol handler operable to receive the acquisition data, modulate a radio-frequency carrier in response to the encoded acquisition data to create an acquisition message including a device code associated with the controlled device and a subchannel address;

the protocol handler being further operable for extracting the control data from the data stream and modulating the radio-frequency carrier in response to the encoded control data to create a control data packet including a message header and the encoded control data, the message header including the subchannel address; and a transmitter coupled to the protocol handler for transmitting the acquisition message and the control data packet to the controlled device so that the controlled device behaves as a character in the scene depicted on the display device.

40. The controller of claim 39, wherein the subchannel address comprises fewer data bits than the device code.

41. The controller of claim 39, wherein the control data comprises:

voice synthesis coefficients for synthesizing voice sounds at the controlled device based on the voice synthesis coefficients.

42. The controller of claim 39, wherein the control data comprises:

motor movement coefficients for operating a motor at the controlled device based on the motor movement coefficients.

43. The method of claim 39, wherein:

the data stream comprises a video signal comprising a plurality of horizontal scan lines, each scan line comprising a horizontal overscan interval; and the control data is encoded in the horizontal overscan intervals.

44. The method of claim 43, wherein the data stream is recovered from a storage media.

45. The method of claim 44, wherein the storage media comprises:

a magnetic tape, an analog laser disk, or a digital laser disk.

46. The method of claim 43, wherein the data stream is received on a broadcast receiver.

47. The method of claim 46, wherein the broadcast receiver comprises:

an aerial antenna, a satellite signal receiver, a direct broadcast satellite signal receiver, or a cable television tuner.

48. A controller for controlling a controlled device of a wireless control system comprising:

a processor for receiving a data stream comprising video data, encoded acquisition data, and encoded control data;

a display device coupled to the processor;

the processor being operable for routing the video data to the display device so that the display device depicts a scene;

the processor being further operable for extracting the acquisition data from the data stream and routing the acquisition data;

a protocol handler coupled to the processor for receiving the acquisition data from the processor and modulating a radio-frequency carrier in response to the acquisition data to create an acquisition message including a device code associated with the controlled device;

a receiver coupled to the protocol handler for receiving from the controlled device a response message including a device identifier;

the protocol handler being further operable for modulating the radio-frequency carrier to create a verification message including the device identifier and a subchannel address;

the protocol handler being further operable for extracting the control data from the data stream, modulating the radio-frequency carrier in response to the control data to create a control data packet including a message header and the control data, the message header including the subchannel address; and a transmitter coupled to the protocol handler for transmitting the acquisition message, the verification message, and the control data packet to a controlled device so that the controlled device behaves as a character in the scene depicted on the display device.

49. The controller of claim 48, wherein the control data comprises:

voice synthesis coefficients for synthesizing voice sounds at the controlled device based on the voice synthesis coefficients.

50. The controller of claim 48, wherein the control data comprises:

motor movement coefficients for operating a motor at the controlled device based on the motor movement coefficients.

51. A controlled device having an assigned device code for a wireless control system comprising:

a receiver for receiving from a controller an acquisition message from a controller modulated on a radio-frequency carrier including a transmitted device code and a subchannel address;

a processor coupled to the receiver for comparing the assigned device code to the transmitted device code and, if the assigned device code corresponds to the transmitted device code, storing the subchannel address at the controlled device as an assigned subchannel address;

the receiver being further operable for receiving from the controller a control data packet modulated on the radio-frequency carrier including a message header and control data, the message header including a message subchannel address; and the processor being further operable for comparing the assigned subchannel address to the message subchannel address and, if the assigned subchannel address corresponds to the message subchannel address, responding to the control data.

52. The controlled device of claim 51, wherein the control data includes voice synthesis coefficients, further comprising:

a voice synthesizer for synthesizing voice sounds based on the voice synthesis coefficients so that the controlled device behaves as a character in a scene depicted on a display device coupled to the controller.

53. The controlled device of claim 52, wherein the control data includes motor movement coefficients, further comprising:

a motor for operating an end effector based on the motor movement coefficients so that the controlled device behaves as a character in a scene depicted on a display device coupled to the controller.

54. A controlled device having an assigned device code for a wireless control system comprising:

a receiver for receiving from a controller an acquisition message modulated on a radio-frequency carrier including a transmitted device code;

a random number generator;

a processor coupled to the receiver and the random number generator for comparing the assigned device code to the transmitted device code and, if the assigned device code corresponds to the transmitted device code, generating a device identifier based on a random number;

the processor being further operable for modulating the radio-frequency carrier in response to the device identifier to create a response message;

a transmitter coupled to the processor for transmitting the response message to the controller;

the receiver being further operable for receiving from the controller a verification message including a transmitted device identifier and a subchannel address;

the processor being further operable for comparing the transmitted device identifier to the device identifier generated by the controlled device, and if the transmitted device identifier corresponds to the device identifier generated by the controlled device, storing the subchannel address at the controlled device as an assigned subchannel address;

the receiver being further operable for receiving from the controller a control data packet modulated on the radio-frequency carrier including a message header and control data, the message header including a message subchannel address; and the processor being further operable for comparing the assigned subchannel address to the message subchannel address and, if the assigned subchannel address corresponds to the message subchannel address, responding to the control data.

55. The controlled device of claim 54, wherein the control data includes voice synthesis coefficients and motor movement coefficients, further comprising:

a voice synthesizer for synthesizing voice sounds based on the voice synthesis coefficients, and a motor for operating an end effector based on the motor movement coefficients so that the controlled device behaves as a character in a scene depicted on a display device coupled to the controller.

56. The controlled device of claim 55, wherein the processor is further operative for delaying the response message by a delay interval based on a second random number.

57. The controlled device of claim 54, further comprising:

a receptor, coupled to the processor, for sending receptor data to the processor in response to a stimulus; and the receiver being further operable for receiving from the controller a receptor data request message modulated on the radio-frequency carrier;

the processor being further operable for modulating the radio-frequency carrier in response to the receptor data request message and the receptor data to create a receptor data response message; and the transmitter being further operable for transmitting the receptor data response message to the controller.

58. The controlled device of claim 57, further comprising:

an elastic queue for storing the voice synthesis coefficients and providing the voice synthesis coefficients to the voice synthesizer so that the controlled device generates voice sounds based on the voice synthesis coefficients while the transmitter transmits the receptor data response message to the controller.

59. The method of claim 54, wherein the device identifier is an electronic serial number assigned by the manufacturer.

60. The method of claim 54, wherein the device identifier is stored within a user-configurable register within the controlled device.

61. A storage medium including a computer program which, when executed by a controller for a wireless control system, causes the controller to perform the steps of:

receiving a data stream comprising video data, encoded acquisition data, and encoded control data;

routing the video data to an output device for presenting a scene;

extracting the acquisition data from the data stream;

modulating a radio-frequency carrier in response to the acquisition data to create an acquisition message including a device code associated with the controlled device;

transmitting the acquisition message to the controlled device;

receiving a response message from the controlled device including a device identifier;

modulating the radio-frequency carrier to create a verification message including the device identifier and a subchannel address;

transmitting the verification message to the controlled device; and extracting the control data including voice synthesis coefficients and motor movement coefficients, modulating the radio-frequency carrier in response to the control data to create a control data packet including a message header and the control data, the message header including the subchannel address, and transmitting the control data to the controlled device so that the controlled device synthesizes voice sounds and operates a motor in synchronization with the scene depicted on the display device.

62. A storage medium including a computer program which, when executed by a controlled device for a wireless control system, causes the controlled device to perform the steps of:

receiving from a controller an acquisition message modulated on a radio-frequency carrier including a transmitted device code;

comparing an assigned device code to the transmitted device code and, if the assigned device code corresponds to the transmitted device code, obtaining a device identifier;

modulating the radio-frequency carrier in response to the device identifier to create a response message;

transmitting the response message to the controller;

receiving from the controller a control data packet modulated on the radio-frequency carrier including a message header and control data including voice synthesis coefficients and motor movement coefficients, the message header including a message subchannel address; and comparing the assigned subchannel address to the message subchannel address and, if the assigned subchannel address corresponds to the message subchannel address, synthesizing voice sounds based on the voice synthesis coefficients and operating a motor based on the motor movement coefficients so that the controlled device behaves as a character in a scene depicted on a display device coupled to the controller.

63. The storage medium of claim 62, wherein the step of obtaining a device identifier further comprises the steps of:

generating a random number; and basing the device identifier on the random number.

64. The storage medium of claim 62, wherein the step of obtaining a device identifier further comprises the steps of:

reading an electronic serial number from a memory device within the controlled device; and basing the device identifier on the electronic serial number.

65. The storage medium of claim 62, wherein the step of obtaining a device identifier further comprises the steps of:

receiving user input commands defining a personal identification number;

storing the personal identification number within a user-configurable register device within the controlled device;

reading the personal identification number from the user-configurable register; and basing the device identifier on the personal identification number.

66. The storage medium of claim 62, further comprising the step of delaying the response message by a delay interval based on a random number.

67. A controlled device having an assigned device code, comprising:

a processor for receiving an acquisition message including a transmitted device code and a subchannel address;

the processor further operable for comparing the assigned device code to the transmitted device code and, if the assigned device code corresponds to the transmitted device code, storing the subchannel address at the controlled device as an assigned subchannel address;

the processor further operable for receiving a control data packet including a message header and control data, the message header including a message subchannel address; and the processor being further operable for comparing the assigned subchannel address to the message subchannel address and, if the assigned subchannel address corresponds to the message subchannel address, responding to the control data.

68. The controlled device of claim 67, wherein the control data includes voice synthesis coefficients, further comprising:

a voice synthesizer for synthesizing voice sounds based on the voice synthesis coefficients so that the controlled device behaves as a character in a scene depicted on a display device coupled to the controller.

69. The controlled device of claim 67, wherein the control data includes motor movement coefficients, further comprising:

a motor for operating an end effector based on the motor movement coefficients so that the controlled device behaves as a character in a scene depicted on a display device coupled to the controller.

70. A controlled device having an assigned device code for, comprising:

a processor for receiving an acquisition message including a device code;

a random number generator;

the processor coupled to the random number generator for comparing the assigned device code to the received device code and, if the assigned device code corresponds to the received device code, generating a device identifier based on a random number;

the processor being further operable for creating a response message in response to the device identifier;

the processor being further operable for receiving a verification message including a received device identifier and a subchannel address;

the processor being further operable for comparing the received device identifier to the device identifier generated by the controlled device, and if the received device identifier corresponds to the device identifier generated by the controlled device, storing the subchannel address at the controlled device as an assigned subchannel address;

the processor being further operable for receiving a control data packet including a message header and control data, the message header including a message subchannel address; and the processor being further operable for comparing the assigned subchannel address to the message subchannel address and, if the assigned subchannel address corresponds to the message subchannel address, responding to the control data.

71. The controlled device of claim 70, wherein the processor is further operative for delaying the response message by a delay interval based on a second random number.

72. The controlled device of claim 70, further comprising:

a receptor, coupled to the processor, for sending receptor data to the processor in response to a stimulus; and the processor being further operable for receiving a receptor data request message;

the processor being further operable for, in response to the receptor data request message, creating a receptor data response message.

73. The controlled device of claim 72, further comprising:

an elastic queue for storing the voice synthesis coefficients and providing the voice synthesis coefficients to the voice synthesizer so that the controlled device generates voice sounds based on the voice synthesis coefficients while the processor creates the receptor data response message.

* * * * *